US012752775B2

(12) United States Patent

Wu et al.

(10) Patent No.: US 12,752,775 B2

(45) Date of Patent: Oct. 6, 2026

(54) VEHICLE DECISION-MAKING PLANNING METHOD AND APPARATUS, DEVICE AND MEDIUM

(71) Applicant: UISEE TECHNOLOGIES (BEIJING) LTD., Beijing (CN)

(72) Inventors: Yangming Wu, Beijing (CN); Xigui Wang, Beijing (CN); Junyang Wang, Beijing (CN); Qisheng Cai, Beijing (CN); Xiaocheng Zhou, Beijing (CN)

(73) Assignee: UISEE TECHNOLOGIES (BEIJING) LTD., Beijing (CN)

( * ) Notice: Subject to any disclaimer, the term of this patent is extended or adjusted under 35 U.S.C. 154(b) by 204 days.

(21) Appl. No.: 18/433,445

(22) Filed: Feb. 6, 2024

(65) Prior Publication Data

US 2024/0174221 A1 May 30, 2024

Related U.S. Application Data

(63) Continuation of application No. PCT/CN2022/088532, filed on Apr. 22, 2022.

(30) Foreign Application Priority Data

Aug. 25, 2021 (CN) ......................... 202110984268.3
Sep. 17, 2021 (CN) ......................... 202111095293.2

(51) Int. Cl.
*B60W 30/09* (2012.01)
*B60W 50/00* (2006.01)
*G08G 1/16* (2006.01)

(52) U.S. Cl.
CPC ........ *B60W 30/09* (2013.01); *B60W 50/0098* (2013.01); *G08G 1/16* (2013.01); *B60W 2050/0052* (2013.01); *B60W 2552/30* (2020.02)

(58) Field of Classification Search
CPC ............... B60W 30/09; B60W 30/095; B60W 2552/30; B60W 2552/53; B60W 2554/20;
(Continued)

(56) References Cited

U.S. PATENT DOCUMENTS

2020/0089239 A1 3/2020 Navarro et al.
2020/0216061 A1 7/2020 Zidek
(Continued)

FOREIGN PATENT DOCUMENTS

CN 106515729 A 3/2017
CN 106708043 A 5/2017
(Continued)

OTHER PUBLICATIONS

Xin Yu, et al., Dynamic Obstacle Detection and Representation Approach for Unmanned Vehicles Based on Laser Sensor, Robot, 2014, pp. 654-661, vol. 36, No. 6.

*Primary Examiner* — Anshul Sood

(74) *Attorney, Agent, or Firm* — Bayramoglu Law Offices LLC

(57) ABSTRACT

A vehicle decision-making planning method, apparatus, device, and medium comprises generating a base coordinate system, generating a guide line in the base coordinate system to determine an approximate travel trajectory of a vehicle in the future, performing obstacle decision-making under the constraint of the guide line, and generating a drivable area based on the obstacle decision-making.

20 Claims, 10 Drawing Sheets

(58) Field of Classification Search

CPC .......... B60W 2554/40; B60W 2556/40; G06V 20/58; G08G 1/16

See application file for complete search history.

(56) References Cited

U.S. PATENT DOCUMENTS

| | | | | |
|---|---|---|---|---|
| 2020/0377085 | A1 | 12/2020 | Floyd-Jones et al. | |
| 2021/0331679 | A1* | 10/2021 | Lilja | B60W 30/0956 |
| 2021/0358184 | A1* | 11/2021 | Molinari | G06T 7/12 |
| 2022/0182498 | A1* | 6/2022 | Singh | G08G 1/16 |

FOREIGN PATENT DOCUMENTS

| | | | |
|---|---|---|---|
| CN | 107016706 | A | 8/2017 |
| CN | 110426044 | A | 11/2019 |
| CN | 110550029 | A | 12/2019 |
| CN | 110562258 | A | 12/2019 |
| CN | 111158359 | A | 5/2020 |
| CN | 111208839 | A | 5/2020 |
| CN | 111231827 | A | 6/2020 |
| CN | 111413701 | A | 7/2020 |
| CN | 111780777 | A | 10/2020 |
| CN | 111795699 | A | 10/2020 |
| CN | 111829545 | A | 10/2020 |
| CN | 112068545 | A | 12/2020 |
| CN | 112148033 | A | 12/2020 |
| CN | 112319477 | A | 2/2021 |
| CN | 112389427 | A | 2/2021 |
| CN | 113682300 | A | 11/2021 |
| DE | 102019109332 | A1 | 10/2020 |
| JP | 2014211759 | A | 11/2014 |
| JP | 2016017914 | A | 2/2016 |
| JP | 2017187422 | A | 10/2017 |
| JP | 2017187844 | A | 10/2017 |
| JP | 2018084987 | A | 5/2018 |
| JP | 2019046147 | A | 3/2019 |
| JP | 2020197770 | A | 12/2020 |
| JP | 2021086555 | A | 6/2021 |
| WO | 2018235159 | A1 | 12/2018 |

* cited by examiner

VEHICLE DECISION-MAKING PLANNING METHOD AND APPARATUS, DEVICE AND MEDIUM

CROSS REFERENCE TO RELATED APPLICATIONS

This application is a continuation application of International Application No. PCT/CN2022/088532, filed on Apr. 22, 2022, which is based upon and claims priority to Chinese Patent Application No. 202110984268.3, filed on Aug. 25, 2021; and Chinese Patent Application No. 202111095293.2, filed on Sep. 17, 2021 the entire contents of which are incorporated herein by reference.

TECHNICAL FIELD

The present disclosure relates to the technical field of unmanned driving, and in particular, to a vehicle decision-making planning method and apparatus, a device, and a medium.

BACKGROUND

With the development of intelligent vehicle technology, an automatic control technology of an unmanned vehicle has gradually become a hot spot in the field of vehicle research. An automatic driving system needs to plan a smooth, safe and passable path for the vehicle to ensure that the vehicle will not collide with obstacles.

Usually, a sensing module of the automatic driving system may output two types of obstacles, one is a convex hull obstacle with rich semantic information, and the other is a grid obstacle without semantic information. For the convex hull obstacle, a decision-making planning module can perform obstacle decision-making conveniently, but for grid obstacles with high dispersion and a large number, it is difficult for the decision-making planning module to perform obstacle decision-making conveniently and quickly, which makes it difficult for the decision-making planning module to perform obstacle decision-making on mixed type obstacles.

SUMMARY

In order to solve the above technical problems or at least partially solve the above technical problems, the present disclosure provides a vehicle decision-making planning method and apparatus, a device, and a medium.

The embodiments of the present disclosure provide a vehicle decision-making planning method, comprising: generating a base coordinate system; generating a guide line in the base coordinate system to determine an approximate travel trajectory of a vehicle in the future; performing obstacle decision-making under the constraint of the guide line; and generating a drivable area based on the obstacle decision-making.

In some embodiments, the performing the obstacle decision-making comprises:

acquiring road information, first grid obstacle information of a first grid obstacle, and first convex hull obstacle information of a first convex hull obstacle;

obtaining a second grid obstacle by preprocessing the first grid obstacle based on the road information and the first grid obstacle information;

converting the second grid obstacle into a second convex hull obstacle; and making an avoidance decision for avoiding a target convex hull obstacle based on target convex hull obstacle information of the target convex hull obstacle, wherein the target convex hull obstacle comprises the first convex hull obstacle and/or the second convex hull obstacle.

In some embodiments, the generating the drivable area according to the obstacle decision-making comprises:

acquiring environmental perception information, wherein the environmental perception information comprises at least two of lane information, obstacle information and vehicle information, and the obstacle information comprises static obstacle information and/or dynamic obstacle information;

determining lane decision semantic information of each lane based on the environmental perception information, wherein the lane decision semantic information comprises a passing time cost and a safety cost; and generating the drivable area based on the lane decision semantic information.

The embodiments of the present disclosure provide a vehicle decision-making planning apparatus, comprising:

a base coordinate system generator configured for generating a base coordinate system;

a guide line generator configured for generating a guide line in the base coordinate system to determine an approximate travel trajectory of a vehicle in the future;

an obstacle decision maker configured for performing obstacle decision-making under the constraint of the guide line; and a driving space generator configured for generating a drivable area based on the obstacle decision-making.

In some embodiments, the obstacle decision maker comprises:

an information acquisition module configured for acquiring road information, first grid obstacle information of a first grid obstacle, and first convex hull obstacle information of a first convex hull obstacle;

a preprocessing module configured for obtaining a second grid obstacle by preprocessing the first grid obstacle based on the road information and the first grid obstacle information, wherein a number of the second grid obstacle is less than a number of the first grid obstacle;

a type conversion module configured for converting the second grid obstacle into a second convex hull obstacle; and an avoidance decision module configured for making an avoidance decision for avoiding a target convex hull obstacle based on target convex hull obstacle information of the target convex hull obstacle, wherein the target convex hull obstacle comprises the first convex hull obstacle and/or the second convex hull obstacle.

In some embodiments, the driving space generator comprises:

a perception information acquisition module configured for acquiring environmental perception information, wherein the environmental perception information comprises at least two of lane information, obstacle information and vehicle information, and the obstacle information comprises static obstacle information and/or dynamic obstacle information;

a lane decision semantic information determination module configured for determining lane decision semantic information of each lane based on the environmental perception information, wherein the lane decision semantic information comprises a passing time cost and a safety cost; and a drivable area generation module configured for generating the drivable area based on the lane decision semantic information.

The embodiments of the present disclosure provide an electronic device, comprising:

a memory and one or more processors;

wherein the memory is in communication connection with the one or more processors, the memory stores instructions executable by the one or more processors, and when the instructions are executed by the one or more processors, the electronic device is configured for implementing the vehicle decision-making planning method provided by any embodiment of the present disclosure.

The embodiments of the present disclosure provide a computer readable storage medium storing a computer program thereon, wherein the computer program, when executed by a computing device, implements the vehicle decision-making planning method provided by any embodiment of the present disclosure.

Compared with the prior art, the technical solutions provided by the embodiments of the present disclosure have the following advantages.

1. After preprocessing the first grid obstacle to obtain the second grid obstacle, the second grid obstacle is converted into the second convex hull obstacle, that is, the obstacle with the grid type is converted into the obstacle with the convex type, so as to realize unified decision-making of the two types of obstacles comprising the obstacle with the grid type and the obstacle with the convex type (that is, the mixed type obstacles), thereby simplifying an obstacle decision-making process of the mixed type obstacles, accelerating the obstacle decision-making process, and enabling the decision-making planning module to perform the obstacle decision-making conveniently and quickly.
2. The lane decision semantic information of each lane is determined according to the environmental perception information, and the lane decision semantic information is converted into a constraint boundary of the drivable area, so that the drivable area with high trafficability and safety can be quickly generated, the generation of the travel trajectory can be accelerated, and the obstacles can be quickly avoided. Meanwhile, passing cost of dynamic obstacles can be characterized by both the passing time cost and the safety cost, and passing cost of static obstacles can also be characterized by the passing time cost. Therefore, the technical solutions of the present disclosure generate the drivable area based on the passing time cost and the safety cost, which can implement the passing planning of the dynamic obstacles and the static obstacles at the same time, and is applicable to the processing of obstacles in a dynamic environment.

BRIEF DESCRIPTION OF THE DRAWINGS

The drawings herein are incorporated into the specification and constitute a part of the specification, show the embodiments consistent with the present disclosure, and serve to explain the principles of the present disclosure together with the specification.

In order to illustrate the technical solutions in the embodiments of the present disclosure or the prior art more clearly, the drawings to be used in the description of the embodiments or the prior art will be briefly described below. Obviously, those of ordinary skills in the art can also obtain other drawings based on these drawings without going through any creative work.

DETAILED DESCRIPTION OF THE EMBODIMENTS

In order to better understand the above objects, features and advantages of the present disclosure, the solutions of the present disclosure will be further described below. It should be noted that, in case of no conflict, the embodiments in the present disclosure and the features in the embodiments may be combined with each other.

In the following description, many specific details are set forth in order to fully understand the present disclosure, but the present disclosure may be practiced in other ways than those described herein. Obviously, the embodiments described in the specification are merely a part of, rather than all of, the embodiments of the present disclosure.

Figure 1:
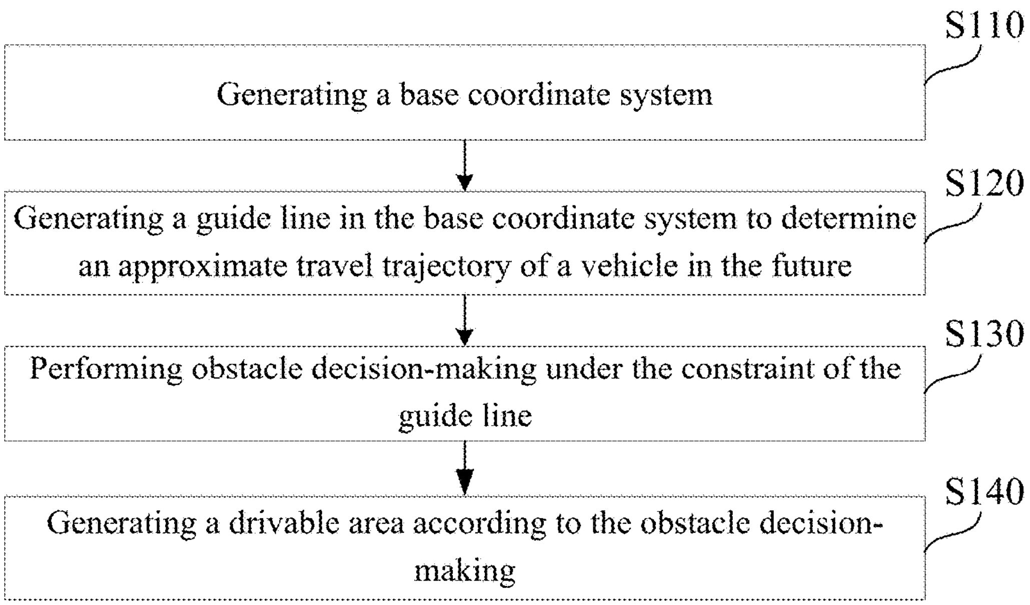
FIG. 1 is a schematic flowchart of a vehicle decision-making planning method provided by the embodiments of the present disclosure.

FIG. 1 is a schematic flowchart of a vehicle decision-making planning method provided by the embodiments of the present disclosure. The can be applied to an unmanned vehicle for obstacle decision-making and generating a drivable area. As shown in FIG. 1, the method comprises the following steps:

S110: generating a base coordinate system.

S120: generating a guide line in the base coordinate system to determine an approximate travel trajectory of a vehicle in the future.

S130: performing obstacle decision-making under the constraint of the guide line.

S140: generating a drivable area according to the obstacle decision-making.

In such embodiment, by generating the base coordinate system, the subsequent guide line, obstacle decision-making data and drivable area are generated in the base coordinate system, thus providing a reference for positioning of the vehicle and the obstacle. The base coordinate system may be a frenet coordinate system. After the guide line is generated, according to the approximate travel trajectory indicated by the guide line, obstacle decision-making is performed for the obstacles on the approximate travel trajectory to avoid the obstacle. Then, according to the obstacle decision-making, it can be determined whether the vehicle needs to pass from a left side of the obstacle, pass from a right side of the obstacle or follow the obstacle, thus determining the driving area of the vehicle.

Figure 2:
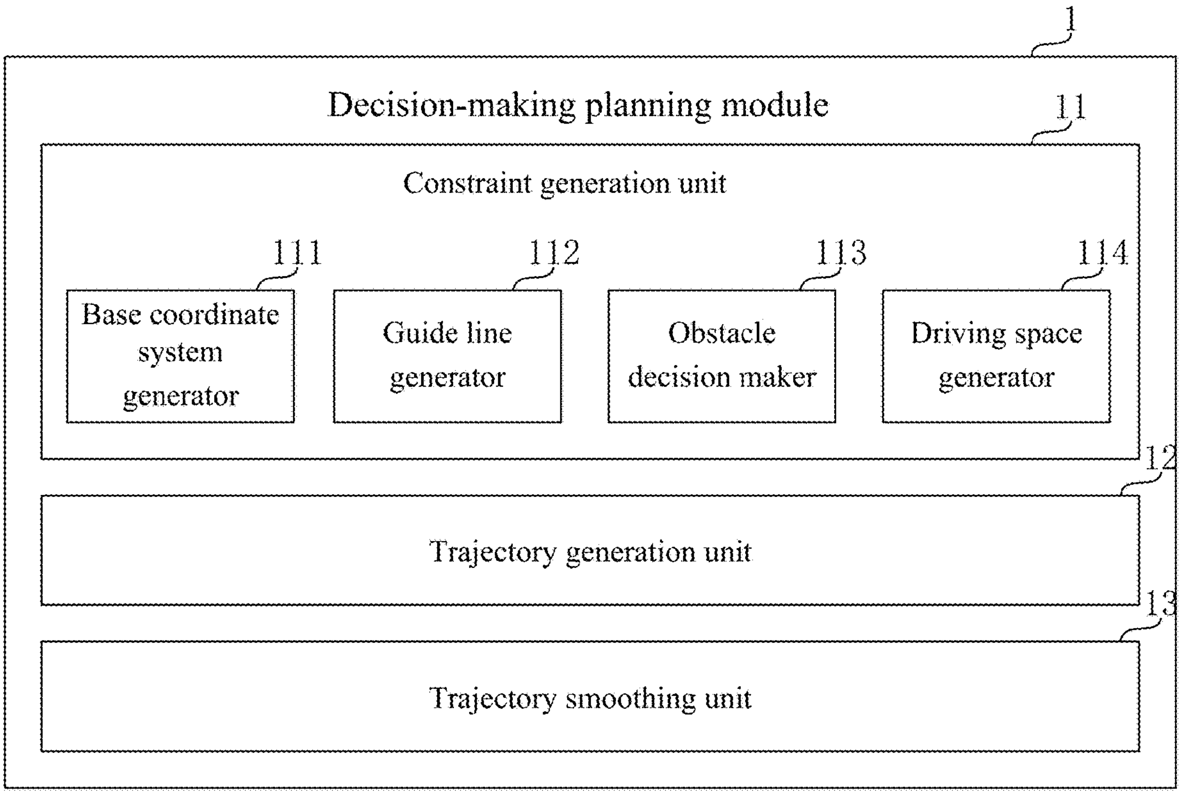
FIG. 2 illustrates a block diagram of functional modules of a decision-making planning module.

FIG. 2 illustrates a block diagram of functional modules of a decision-making planning module. As shown in FIG. 2, the decision-making planning module 1 may comprise a constraint generation unit 11, a trajectory generation unit 12 and a trajectory smoothing unit 13.

In some embodiments, the constraint generation unit 11 comprises a base coordinate system generator 111, a guide line generator 112, an obstacle decision maker 113 and a driving space generator 114. The base coordinate system generator 111 is configured for generating a base coordinate system, such as a frenet coordinate system, and the like; the guide line generator 112 is configured for generating a guide line to determine an approximate travel trajectory of a vehicle in the future; the obstacle decision maker 113 is configured for performing obstacle decision-making; and the driving space generator is configured for generating a drivable area based on the obstacle decision-making. In some embodiments, the trajectory generation unit 12 is configured for generating a travel trajectory of an unmanned vehicle according to the drivable area; and the trajectory smoothing unit 13 is configured for smoothing the travel trajectory.

In some embodiments, the obstacle decision maker 113 is specifically configured for acquiring road information, first grid obstacle information of a first grid obstacle, and first convex hull obstacle information of a first convex hull obstacle; obtaining a second grid obstacle by preprocessing the first grid obstacle based on the road information and the first grid obstacle information; converting the second grid obstacle into a second convex hull obstacle; and making an avoidance decision for avoiding a target convex hull obstacle based on target convex hull obstacle information of the target convex hull obstacle.

In some embodiments, the driving space generator 114 is specifically configured for acquiring environmental perception information; determining lane decision semantic information of each lane based on the environmental perception information, wherein the lane decision semantic information comprises a passing time cost and a safety cost; and generating the drivable area based on the lane decision semantic information.

Figure 3:
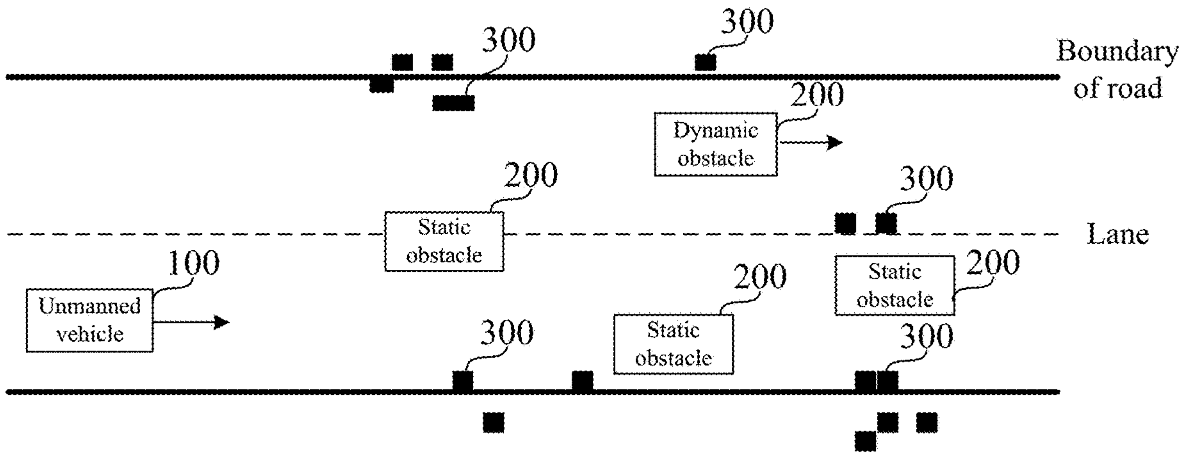
FIG. 3 is a schematic diagram of an applicable scenario of the vehicle decision-making planning method provided by the embodiments of the present disclosure.

Based on the above technical solution, the embodiment of the present disclosure provides a vehicle decision-making planning method, which is suitable for the situation that the unmanned vehicle makes decisions on static obstacles and/or dynamic obstacles such as grid obstacles and convex hull obstacles in a road environment. FIG. 3 illustrates an applicable scenario of the vehicle decision-making planning method. Referring to FIG. 3, there are convex hull obstacles 200 (comprising static obstacle and dynamic obstacle) and grid obstacles 300 in front of the unmanned vehicle 100. The unmanned vehicle 100 can convert a type of the grid obstacle 300 into a convex hull type by acquiring obstacle information of the convex hull obstacles 200 and the grid obstacles 300, thus realizing unified decision-making of the convex hull obstacles 200 and the grid obstacles 300. This method can be applied to the unmanned vehicle, especially to a decision-making planning module in an automatic driving system of the unmanned vehicle. Based on the vehicle decision-making planning method provided by the embodiment of the present disclosure, the unified decision-making of mixed type obstacles can be realized, and the obstacle decision-making can be performed conveniently and quickly.

Figure 4:
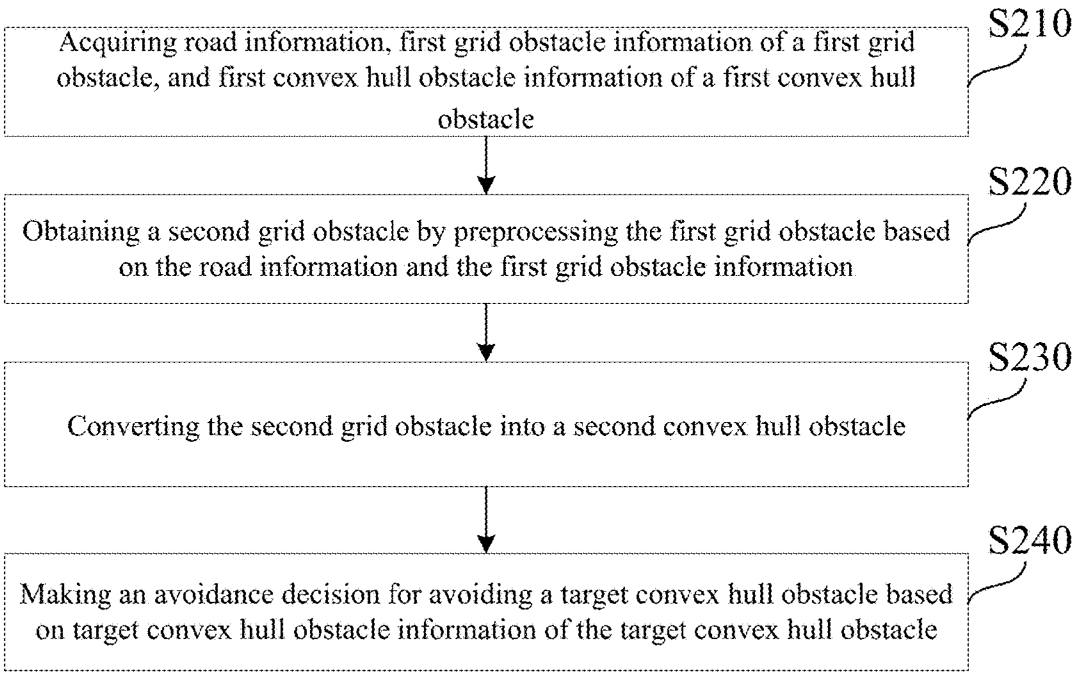
FIG. 4 is a partial schematic flowchart of the vehicle decision-making planning method provided by the embodiments of the present disclosure.

Based on the above technical solution, FIG. 4 is a partial schematic flowchart of the vehicle decision-making planning method provided by the embodiment of the present disclosure. As shown in FIG. 4, the performing the obstacle decision-making (or decision-making method for avoiding obstacle) comprises the following steps:

S210: acquiring road information, first grid obstacle information of a first grid obstacle, and first convex hull obstacle information of a first convex hull obstacle.

In the embodiment of the present disclosure, the grid obstacle is obstacle with a grid type, and the convex hull obstacle is obstacle with a convex type.

In some embodiments, the road information can be acquired through a high-precision map or a vehicle-mounted camera, and the road information may comprise road boundary information, road curvature information and the like. At the same time, the obstacle information can be acquired by a sensing module (such as vehicle-mounted camera and laser radar) and a positioning module of a vehicle. The obstacle information may comprise obstacle type information, obstacle size information, obstacle position information and the like. The obstacle type information may be an obstacle type identifier, and obstacle types can be distinguished by pre-defining different obstacle type identifiers. The obstacle type information may also be regarded as an obstacle data format. After sensing the obstacle, a sensing module of the vehicle may process the obstacle data and store the data with different types of obstacles in different obstacle data formats. A decision-making planning module can distinguish the obstacle types by the obstacle data formats when acquiring the obstacle information. For example, an obstacle data format of the grid obstacle is ".ogm" and an obstacle data format of the convex hull obstacle is ".mot". In this way, the first grid obstacle information and the first convex hull obstacle information may be obtained by determining the first grid obstacle and the first convex hull obstacle based on the obstacle type information.

S220: obtaining a second grid obstacle by preprocessing the first grid obstacle based on the road information and the first grid obstacle information.

S230: converting the second grid obstacle into a second convex hull obstacle.

Figure 5:
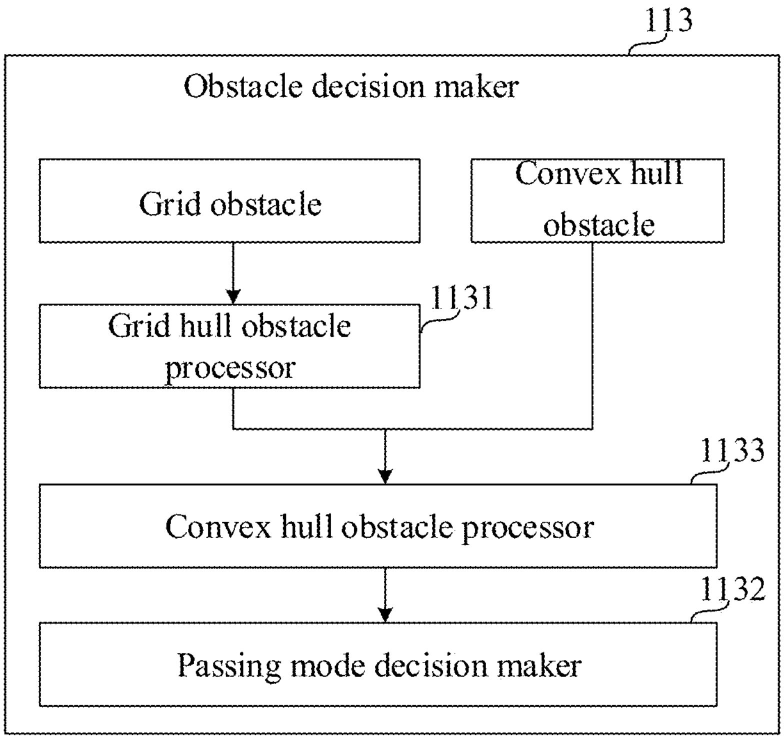
FIG. 5 is a block diagram of functional modules of an obstacle decision maker provided by the embodiments of the present disclosure.

FIG. 5 illustrates a block diagram of functional modules of an obstacle decision maker. As shown in FIG. 5, the obstacle decision maker 113 may comprise a grid obstacle processor 1131, a passing mode decision maker 1132 and a convex hull obstacle filter 1133.

The grid obstacle processor 1131 may execute the S220 of obtaining the second grid obstacle by preprocessing the first grid obstacle based on the road information and the first grid obstacle information; and the S230 of converting the second grid obstacle into the second convex hull obstacle.

In S220, preprocessing the first grid obstacle may be used to reduce a data calculation amount and simplify an obstacle decision-making process, which may comprise at least one of the following steps: generating a grid obstacle contour of the first grid obstacle; generating an obstacle bounding box of the first grid obstacle; filtering out the first grid obstacle outside a road; and aggregating the first grid obstacle located in the road.

In some embodiments, the first grid obstacle may be preprocessed to enable a number of the second grid obstacle obtained after preprocessing being smaller than that of the first grid obstacle, thus facilitating the calculation of obstacles by a downstream module.

The embodiments of the present disclosure can reduce the number of the first grid obstacle by filtering out the first grid obstacle located outside the road. In some embodiments, the obtaining the second grid obstacle by preprocessing the first grid obstacle based on the road information and the first grid obstacle information may comprise the following step:

S221: filtering out the first grid obstacle outside a road based on the road information and the first grid obstacle information.

In some embodiments, the filtering out the first grid obstacle outside the road based on the road information and the first grid obstacle information may comprise the following step of:

S2211: generating a road bounding box along a road passing direction based on the road information.

In some embodiments, a road boundary is discretized into boundary points based on the road information; and the road bounding box is generated based on the boundary points. According to the embodiments of the present disclosure, a shape of the road bounding box is an axisymmetric bounding box based on a right-hand coordinate system of a body of the unmanned vehicle, which can only pass through the boundary point and cover the road for subsequently judging whether the first grid obstacle is located outside the road.

Figure 6:
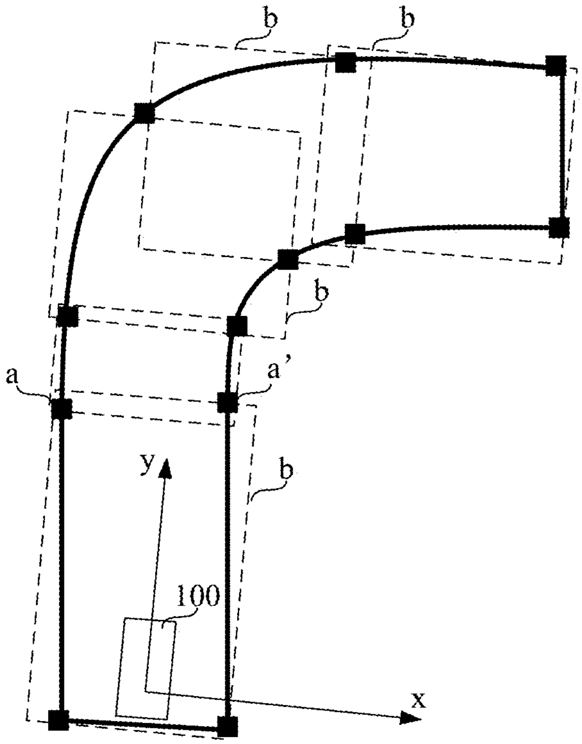
FIG. 6 is schematic diagram of a road bounding box provided by the embodiments of the present disclosure.

Specifically, with reference to FIG. 6, the road boundary and a curvature of the road boundary may be determined based on the road information. The road boundary is discretized based on the curvature of the road boundary to obtain boundary point groups arranged at intervals along a road passing direction, wherein each boundary point group comprises left boundary points a and right boundary points a', which correspond to each other in a transverse direction, and the transverse direction is perpendicular to the road passing direction. A rectangular frame b passing through each boundary point in any two adjacent boundary point groups may be generated based on any two adjacent boundary point groups, and the rectangular frame b may be taken as the road bounding box.

In some embodiments, in the two adjacent sides of the rectangular frame b, one side is parallel to a driving direction of the vehicle, which can be referred as a driving direction x of the unmanned vehicle 100, and the other side is perpendicular to the driving direction of the vehicle, which can be referred as a normal direction y of the unmanned vehicle 100. At the same time, a distance between two adjacent boundary points on the same road boundary is negatively related to the curvature of the road boundary, that is, the greater the curvature of the road boundary, the greater the degree of bending, and the smaller the distance between the two adjacent boundary points on the road boundary. Thus, it can ensure that the road bounding box can completely cover the road, and part of the first grid obstacle located in the road which may be determined to be located outside the road can be prevented from being filtered out, and avoiding influencing obstacle decision-making.

In some embodiments, the discretizing the road boundary based on the curvature of the road boundary to obtain the boundary point groups arranged at intervals along the road passing direction comprises: taking a current position of the vehicle as an initial road point; acquiring one boundary point group corresponding to the initial road point in the transverse direction; selecting next road point along the road passing direction based on the curvature of the road boundary, wherein a distance between two adjacent road points is negatively correlated with the curvature of the road boundary; and taking the next road point as the initial road point, returning to executing the step of acquiring one boundary point group corresponding to the initial road point in the transverse direction until a distance from last next road point to the current position of the vehicle in the road passing direction is greater than a preset distance threshold, and determining all the currently acquired boundary point groups as the boundary point groups. The preset distance threshold may be determined according to a maximum scope of obstacles perceived by the vehicle.

Based on the above technical solution, in a specific embodiment of the present disclosure, every four boundary points (two adjacent boundary points on the left side of the road and two adjacent boundary points on the right side of the road) can generate one road bounding box $B_R=\{b_{min}, b_{max}, b_{left,0}, b_{left,1}, b_{right,0}, b_{right,1}\}$, wherein $b_{min}$ and $b_{max}$ are minimum and maximum coordinate points of the road bounding box, $b_{left,0}$, $b_{left,1}$, $b_{right,0}$, $b_{right,1}$ are left-side coordinate points and right side coordinate points of the road respectively, so that the whole road can be represented by n road bounding boxes to generate a road bounding box sequence $B_{road\_list}=\{B_{R0}, B_{R1}, \ldots, B_{Rn}\}$. In the embodiment of the present disclosure, the road may be one route segment in a driving route of the vehicle, and the route segment where the vehicle is located can be determined according to the positioning information of the vehicle, and the road boundary is discretized, that is, a boundary of the route segment where the vehicle is located is discretized. For example, a list of the road boundary points is defined as S, and is initialized to be an empty list, and the road bounding box sequence $B_{road\_list}$ is also initialized to be empty. The road boundary is dispersed from the route segment where the vehicle is located, and a first road point of the route segment (which may be the current position of the vehicle) is acquired, and then the left boundary point and the right boundary point corresponding to the first road point in a horizontal direction are acquired, and the current left boundary point and the right boundary point are added to the list S. Based on the curvature of the road boundary, next road point is selected along the road passing direction, and whether a distance from the first road point to the next road point along the road passing direction is less than or equal to a preset distance threshold is checked. If the distance is less than or equal to the preset distance threshold, left boundary points and right boundary points corresponding to the next road point in the horizontal direction are obtained and added to the list S. Based on the curvature of the road boundary, next road point is continuously selected along the road passing direction until the distance from the first road point to the next road point along the road passing direction is greater than the preset distance threshold. Then, the acquiring of the left boundary points and the right boundary points is stopped and the road bounding box sequence $B_{road\_list}$ is generated based on the finally updated list S.

S2212: generating a grid obstacle bounding box of the first grid obstacle based on the first grid obstacle information.

In some embodiments, a grid obstacle contour of the first grid obstacle is generated based on the first grid obstacle information; and a grid obstacle bounding box is generated based on the grid obstacle contour.

Specifically, based on the first grid obstacle information, a suzuki contour tracking algorithm is used to generate a closed contour graph of the first grid obstacle, that is, the grid obstacle contour. Thus, it can avoid processing all original point cloud grid obstacle data, which may reduce greatly hardware requirements for processors and sensors. Exemplary, the grid obstacle contour is $\Omega=\{p_0, p_1, \ldots, p_n\}$, $p_0$ is one coordinate point of the grid obstacle contour, which consists of n coordinate points. The grid obstacle bounding box is $B=\{P_{min}, P_{max}\}$, and four vertices of the grid obstacle bounding box may be composed of coordinate values two coordinate points $p_{min}=[x_{min}, y_{min}]$ and $p_{max}=[x_{max}, y_{max}]$, wherein:

$$\begin{cases} x_{max} = \max\{x_0, x_1, \ldots, x_n\} \\ y_{max} = \max\{y_0, y_1, \ldots, y_n\} \\ x_{min} = \min\{x_0, x_1, \ldots, x_n\} \\ y_{min} = \min\{y_0, y_1, \ldots, y_n\} \end{cases},$$

wherein $x_0, x_1, \ldots, x_n$ are x coordinates of n coordinate points in the grid obstacle contour, and $y_0, y_1, \ldots, y_n$ are y coordinates of the n coordinate points in the grid obstacle contour.

S2213: determining the first grid obstacle located outside the road based on the grid obstacle bounding box and the road bounding box.

The embodiment of the present disclosure may perform two-stage collision detection on the first grid obstacle to quickly and accurately determine the first grid obstacle located outside the road. For example, rough collision detection may be performed on the grid obstacle first, so as to quickly filter out the first grid obstacle located outside the road and reduce a calculation amount of collision detection. For the first grid obstacle that collides as determined by the rough collision detection, fine collision detection is performed again to further determine the first grid obstacle located outside the road, so as to ensure that a remaining part of the first grid obstacles after filtering are all located in the road.

For the above-mentioned rough collision detection, in some embodiments, for each grid obstacle bounding box, a target road bounding box with a smallest Euclidean distance to the grid obstacle bounding box is determined from the road bounding box based on the grid obstacle bounding box and the road bounding box; collision detection is performed on the grid obstacle bounding box and the corresponding target road bounding box; and if the grid obstacle bounding box does not collide with the corresponding target road bounding box, it is determined that the first grid obstacle corresponding to the grid obstacle bounding box is located outside the road. When the Euclidean distance from the road bounding box to the grid obstacle bounding box is relatively small, it indicates that a possibility of collision between the road bounding box and the grid obstacle bounding box is greater. If none road bounding boxes corresponding to the smaller Euclidean distance collide with the grid obstacle bounding box, then the road bounding boxes corresponding to the smaller Euclidean distance will not collide with the grid obstacle. Therefore, by determining the target road bounding box with the smallest Euclidean distance from the road bounding box to the grid obstacle bounding box and performing collision detection with the grid obstacle bounding box, the calculation amount of collision detection can be reduced, thus velocitying up an obstacle decision-making velocity. In some embodiments, it is only necessary to detect whether vertexes of the grid obstacle bounding box are located on the target road bounding box or in the target road bounding box. For example, when the vertex of the grid obstacle bounding box are all located outside the target road bounding box, it is determined that the first grid obstacle corresponding to the grid obstacle bounding box is located outside the road. When the vertexes of the grid obstacle bounding box are located on the target road bounding box or in the target road bounding box, it is determined that the first grid obstacle corresponding to the grid obstacle bounding box is located in the road.

For the above fine collision detection, in some embodiments, if the grid obstacle bounding box collides with the corresponding target road bounding box, it is judged whether the first grid obstacle corresponding to the grid obstacle bounding box is located outside the road. In some embodiments, the collision detection is performed based on the boundary point of the target road bounding box and the grid obstacle bounding box through a vector cross product, and it is judged whether the first grid obstacle corresponding to the grid obstacle bounding box is located outside the road. Specifically, a boundary point vector is determined; a vertex vector of the grid obstacle bounding box is determined; and when a cross product of the vertex vector of the grid obstacle bounding box and the boundary point vector is greater than 0, it is determined that the first grid obstacle corresponding to the grid obstacle bounding box is located outside the road. When a cross product of the vertex vector of the grid obstacle bounding box and the boundary point vector is less than or equal than 0, it is determined that the first grid obstacle corresponding to the grid obstacle bounding box is located in the road. The boundary point vector comprises a left boundary vector composed of two left boundary points of the target road bounding box and a right boundary vector composed of two right boundary points of the target road bounding box. The vertex vector of the grid obstacle bounding box is a vector composed of the vertexes of the grid obstacle bounding box and one boundary point of the target road bounding box, and the boundary point is one boundary point corresponding to the boundary point vector participating in the cross product operation. For example, when the vertex vector is cross-product with the right boundary vector, the boundary point in the vertex vector is one boundary point corresponding to the right boundary vector. For example, the grid obstacle bounding box is $B=\{P_{min},P_{max}\}$, the target road bounding box is $B_R=\{b_{min}, b_{max}, b_{left,0}, b_{left,1}, b_{right,0}, b_{right,1}\}$, the left boundary vector is $v_{left}=b_{left,1}-b_{left,0}$ and the right boundary vector is $v_{right}=b_{right,1}-b_{right,0}$, and then the four vertices of the grid obstacle bounding box B are traversed to form four vertex vectors, the four vertex vectors are subjected to are cross-product with the left boundary vector or the right boundary vector respectively, and it is judged that the first grid obstacle corresponding to the grid obstacle bounding box is located outside the road according to the cross-product result. For example, one of the vertices of B is $p_0=[x_{min},y_{min}]$, then the cross product of the right boundary vector and the vertex vector is $c_1=\text{cross}(p_0-b_{right,0},v_{right})$, if $c_1>0$, then the vertex $p_0$ is on the right side of the right boundary of the road; otherwise, the vertex $p_0$ is on the right boundary of the road or on the left side of the right boundary of the road. Similarly, it can be judged that other vertices of the grid obstacle bounding box are on the right boundary of the road or on the left side or right side of the right boundary of the road. In this way, it can be judged whether the first grid obstacle corresponding to the grid obstacle bounding box is located outside the road.

S2214: filtering out the first grid obstacle located outside the road.

S222: taking a remaining part of the first grid obstacle as the second grid obstacle.

Moreover, the embodiment of the present disclosure can also reduce the number of the first grid obstacle by aggregating the first grid obstacles located in the road. In some embodiments, the obtaining the second grid obstacle by preprocessing the first grid obstacle based on the road information and the first grid obstacle information may also comprise the following steps:

S223: determining the first grid obstacle located in the road based on the road information and the first grid obstacle information.

In such embodiment, the first grid obstacle located in the road can be determined by the method of judging whether the first grid obstacle is located outside the road in the above embodiment, which is not repeated here.

S224: aggregating the first grid obstacle located in the road.

In some embodiments, the first obstacle bounding box of the first grid obstacle is generated based on the first grid obstacle information of the first grid obstacle located in the road; two adjacent first obstacle bounding boxes are merged to generate a second obstacle bounding box when the Euclidean distance between the two adjacent first obstacle bounding boxes is smaller than a width of the vehicle; and the second obstacle bounding box is taken as the first obstacle bounding box, and it is returned to execute the step of merging the two adjacent first obstacle bounding boxes to generate the second obstacle bounding box when the Euclidean distance between the two adjacent first obstacle bounding boxes is smaller than the width of the vehicle until the Euclidean distance between the second obstacle bounding box and the adjacent first obstacle bounding box is greater than or equal to the width of the vehicle or no first obstacle bounding box is adjacent to the second obstacle bounding box.

For example, a CLOSED list may be created and initialized as an empty list, one first obstacle bounding box is taken out from a set $set_{contour}$ of first obstacle bounding boxes and added to the CLOSED list, and the first obstacle bounding box is deleted from the set $set_{contour}$, and then the set $set_{contour}$ is traversed. Once the Euclidean distance between the first obstacle bounding box in the set $set_{contour}$ and the first obstacle bounding box in the CLOSED list is less than the width of the vehicle, the first obstacle bounding box of the set $set_{contour}$ is added to the CLOSED list, and aggregated with the first obstacle bounding box in the CLOSED list for Euclidean distance comparison to form a new first obstacle bounding box, and then the first obstacle bounding box added to the CLOSED list is deleted from the set $set_{contour}$. This cycle is repeated until the set $set_{contour}$ is empty, and the aggregating of the first grid obstacle located in the road can be completed.

S225: taking the aggregated first grid obstacle as the second grid obstacle.

Furthermore, the embodiment of the present disclosure can also filter out the first grid obstacle located outside the road based on the road information and the first grid obstacle information, and determine the first grid obstacle located in the road based on the road information and the first grid obstacle information, and aggregate the first grid obstacle located in the road. In this manner, a number of the first grid obstacle can be further reduced.

Based on the above embodiment, after the second grid obstacle is obtained, a fast convex hull algorithm can be used to convert the second grid obstacle into the second convex hull obstacle. In this way, the unified decision-making of the grid obstacle and the convex hull obstacle can be realized.

S240: making an avoidance decision for avoiding a target convex hull obstacle based on target convex hull obstacle information of the target convex hull obstacle.

This step can be performed by the passing mode decision maker 1132 in FIG. 5. In some embodiments, the making the avoidance decision on the target convex hull obstacle based on target convex hull obstacle information of the target convex hull obstacle comprises: marking an avoidance-free label or a lateral avoidance-free label on the target convex hull obstacle meeting a preset filtering condition based on the target convex hull obstacle information. The embodiment of the present disclosure can make the trajectory generation unit 12 in FIG. 2 ignore the target convex hull obstacle by marking the avoidance-free label or the lateral avoidance-free label on the target convex hull obstacle meeting the preset filtering condition, which can not only reduce the burden of obstacles handled by the trajectory generation unit 12, but also improve a trajectory generation velocity and trajectory generation rationality.

In some embodiments, the preset filtering condition comprises at least one of the following: the target convex hull obstacle is located outside the road; a motion state of the target convex hull obstacle meets a lateral avoidance-free condition; and the target convex hull obstacle is located on the guide line of the vehicle. Correspondingly, the marking the avoidance-free label or the lateral avoidance-free label on the target convex hull obstacle meeting the preset filtering condition based on the target convex hull obstacle information comprises: when the target convex hull obstacle is located outside the road, marking the avoidance-free label on the target convex hull obstacle; and when the motion state of the target convex hull obstacle meets the lateral avoidance-free condition or the target convex hull obstacle is located on the guide line of the vehicle, marking the lateral avoidance-free label on the target convex hull obstacle. For example, referring to FIG. 7, when the target convex hull obstacle is located outside the road, such as an obstacle 1, the target convex hull obstacle has no influence on the normal running of the unmanned vehicle 100 at all. In this case, the target convex hull obstacle can be ignored and the avoidance-free label is marked on the target convex hull obstacle. When a motion state of the target convex hull obstacle meets the lateral avoidance-free condition, for example, when the target convex hull obstacle crosses the road, such as a pedestrian crossing the road, the unmanned vehicle 100 only needs to wait for the pedestrian to pass, and does not need to generate a trajectory around the pedestrian, so that the lateral avoidance-free label can be marked on the pedestrian. For another example, when the target convex hull obstacle changes lanes to the lane of the vehicle, or a longitudinal velocity of the target convex hull obstacle is greater than a velocity of the vehicle (such as an obstacle moving at a high velocity in an adjacent lane), the vehicle does not need to avoid laterally without affecting the safety of the lane of the vehicle, and the lateral avoidance-free label can be marked on the target convex hull obstacle. For another example, if the target convex hull obstacle is located on the guide line of the vehicle, for example, if an obstacle 2 is located on the guide line c of the vehicle, the unmanned vehicle 100 does not need to avoid the obstacle 2 laterally, so it is only necessary to follow the obstacle 2. It can be understood that the obstacle 2 should be a dynamic obstacle moving in the same direction as the unmanned vehicle 100.

In the above embodiment, the target convex hull obstacle meeting the preset filtering condition can be filtered by the convex hull obstacle filter 1133 in FIG. 5. In some embodiments, the convex hull obstacle filter 1133 may comprise at least one of a road network filter based on an obstacle frenet bounding box, a behavior semantic information filter, and a guide line filter. The road network filter based on the obstacle frenet bounding box can quickly filter out the target convex hull obstacle located outside the road, and the road network filter based on the obstacle frenet bounding box can filter out the target convex hull obstacle located outside the road by using the two-stage collision detection method in the above embodiment. The behavioral semantic information filter can filter out avoidance-free target convex hull obstacles and lateral avoidance-free target convex hull obstacles according to the semantic information contained in the target convex hull obstacle. The guide line filter can filter out the target convex hull obstacle that collides with the guide line.

In addition to marking the avoidance-free label on the target convex hull obstacle to make avoidance-free decision and mark the lateral avoidance-free label on the target convex hull obstacle to make lateral avoidance-free decision, the embodiment of the present disclosure can also make avoidance decision for the target convex hull obstacle to follow, pass on the left or pass on the right. In some embodiments, the marking the avoidance label on the target convex hull obstacle based on the target convex hull obstacle information and the guide line of the vehicle may also comprise: if the target convex hull obstacle is located on the guide line of the vehicle, marking the following label on the target convex hull obstacle; and if the target convex hull obstacle is not located on the guide line of the vehicle, when a center of mass of the target convex hull obstacle is located at a left side of the guide line of the vehicle, marking the right passing label on the target convex hull obstacle, and when the center of mass of the target convex hull obstacle is located on a right side of the guide line of the vehicle, marking the left passing label on the target convex hull obstacle.

Figure 7:
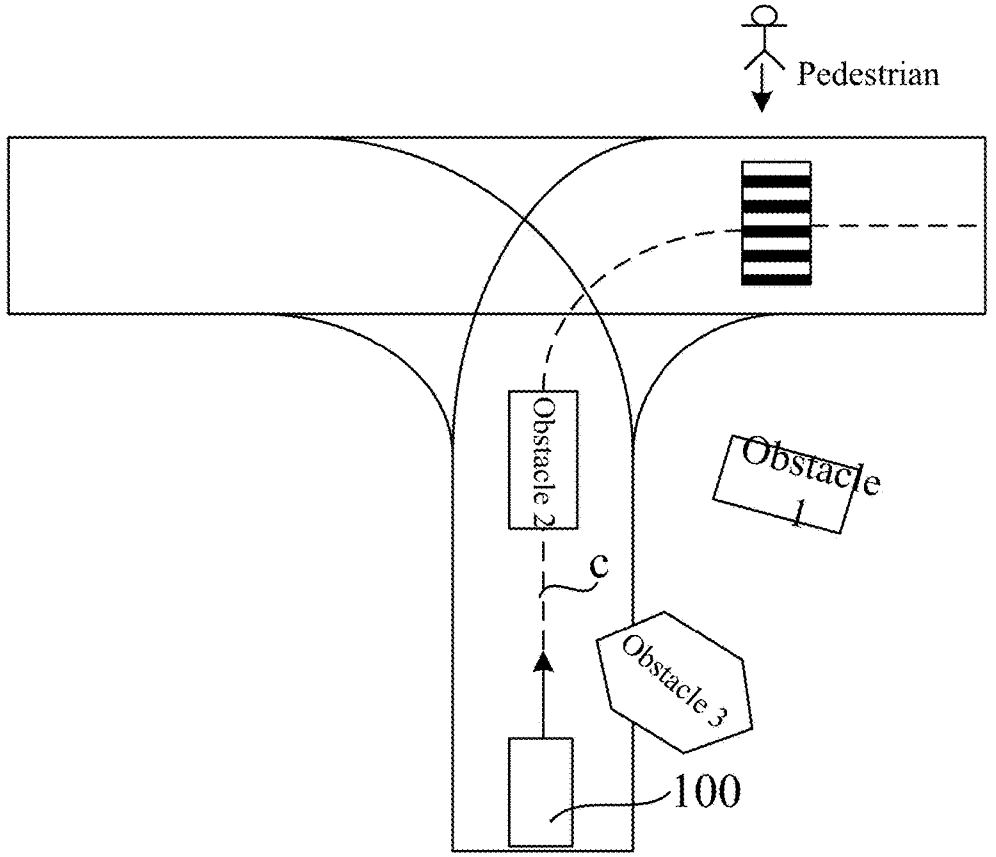
FIG. 7 is a scenario diagram of avoidance decision provided by the embodiments of the present disclosure.

Continuously referring to FIG. 7, the obstacle 2 is located on the guide line c of the vehicle. In this case, the unmanned vehicle 100 only needs to follow the obstacle 2 and mark the following label on the obstacle 2. An obstacle 3 is located in the road, but not on the guide line c of the vehicle, and affects the lane safety of the unmanned vehicle 100. In this case, it is necessary to pass from a left side or a right side of the obstacle 3 to avoid the obstacle 3. Based on the technical solution of the present disclosure, a relative position between a center of mass of the obstacle 3 and the guide line c of the vehicle is detected. If the center of mass of the obstacle 3 is located on the right side of the guide line c of the vehicle (as shown in FIG. 7), it is necessary to pass from the left side of the obstacle 3, and the left passing label is marked on the obstacle 3. If the center of mass of the obstacle 3 is located on the left side of the guide line c of the vehicle, it is necessary to pass from the right side of the obstacle 3, and the right passing label is marked on the obstacle 3.

According to the vehicle decision-making planning method provided by the embodiments of the present disclosure, after preprocessing the first grid obstacle to obtain the second grid obstacle, the second grid obstacle is converted into the second convex hull obstacle, that is, the obstacle with the grid typeobstacle with a grid type is converted into the obstacle with the convex type, so as to realize unified decision-making of the two types of obstacles comprising the obstacle with the grid typeobstacle with a grid type and the obstacle with the convex type (that is, the mixed type obstacles), thereby simplifying an obstacle decision-making process of the mixed type obstacles, accelerating the obstacle decision-making process, and enabling the decision-making planning module to perform the obstacle decision-making conveniently and quickly.

With the development of intelligent vehicle technology, an automatic control technology of an unmanned vehicle has gradually become a hot spot in the field of vehicle research. An automatic driving system needs to plan a smooth, safe and passable path for the vehicle to ensure that the vehicle will not collide with obstacles. For an optimization-based planning algorithm, an optimization method in Ducal space proposed by Julius Ziegler can transform one planning issue into one optimization issue. However, this method greatly increases calculation burden of a planning module, cannot solve the problem of fast obstacle avoidance, and reduces a trajectory generation velocity. Moreover, this method is not suitable for dealing with obstacles in a dynamic environment.

Figure 8:
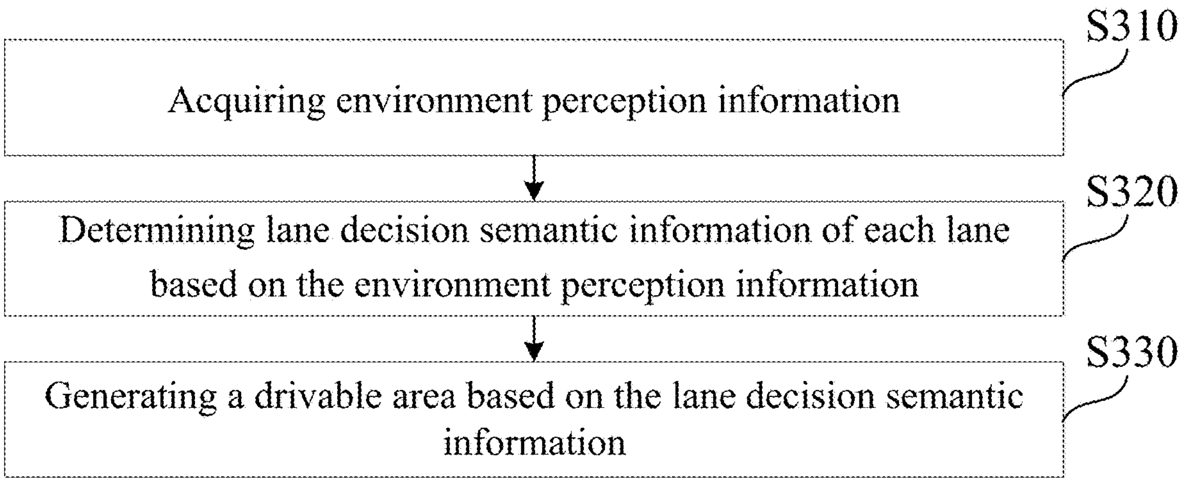
FIG. 8 is a partial schematic flowchart of another vehicle decision-making planning method provided by the embodiments of the present disclosure.

In view of the above technical problems, FIG. 8 is a partial schematic flowchart of another vehicle decision-making planning method provided by the embodiments of the present disclosure. The method is suitable for a situation that an unmanned vehicle generates a driving area for static obstacles and/or dynamic obstacles, and the method can be executed by a driving space generator. As shown in FIG. 8, generating a drivable area (or a method for generating a drivable area of a vehicle) according to obstacle decision comprises the following steps:

S310: acquiring environmental perception information.

The environmental perception information comprises at least two of lane information, obstacle information and vehicle information, and the obstacle information comprises static obstacle information and/or dynamic obstacle information. In some embodiments, the lane information may comprise lane line information and road boundary information, and may be acquired by using a vehicle-mounted camera. The obstacle information may comprise obstacle position information, obstacle size information and obstacle motion information, wherein the obstacle position information can be acquired by using a high-precision map and a vehicle-mounted camera/laser radar, the obstacle size information can be acquired by using a vehicle-mounted camera, and the obstacle motion information can be acquired by using a vehicle-mounted camera/laser radar. The vehicle information may comprise position information of the vehicle and motion information of the vehicle, wherein the position information of the vehicle can be acquired by using a high-precision map and a positioning module of the vehicle (such as a GPS), while the motion information of the vehicle can be acquired by using a motion sensor of the vehicle (such as a velocity sensor, an acceleration sensor, and the like).

S320: determining lane decision semantic information of each lane based on the environmental perception information.

The lane decision semantic information comprises a passing time cost and a safety cost. The passing time cost is used to characterize a passing situation of the lane. For example, if the vehicle can pass one lane quickly, the passing time of the lane is fast. The safety cost is used to characterize safety of the lane.

In some embodiments, the passing time cost of lane can be determined according to a size relationship between a longitudinal velocity of the vehicle and a longitudinal velocity of the obstacle. Correspondingly, when the lane decision semantic information comprises the passing time cost, the determining the lane decision semantic information of each lane based on the environmental perception information comprises: for each lane, determining a collision time between the vehicle and a first obstacle in front of the vehicle based on the environmental perception information; and determining the collision time as the passing time cost.

Specifically, the environmental perception information comprises position information of the vehicle and longitudinal velocity information of the vehicle as well as position information and longitudinal velocity information of the front obstacle on each lane closest to the vehicle, and a longitudinal distance from the vehicle to the front obstacle on each lane closest to the vehicle is calculated respectively according to the position information of the vehicle and the obstacle position information; and it is judged whether the longitudinal velocity of the obstacle is less than the longitudinal velocity of the vehicle according to the longitudinal velocity information of the vehicle and the longitudinal velocity information of the obstacle. When the longitudinal velocity of the obstacle is less than the longitudinal velocity of the vehicle, the collision time when the vehicle collides with the front obstacle is predicted according to the longitudinal distance, the longitudinal velocity information of the vehicle and the longitudinal velocity information of the obstacle, and the collision time is determined as the passing time cost. In addition, if there is no obstacle in front of the vehicle or the longitudinal velocity of the first obstacle in front of the vehicle is greater than or equal to the longitudinal velocity of the vehicle, a preset time period is determined as the passing time cost. Based on the above technical solution, the following formula may be used to calculate the passing time cost:

$$TCC = \begin{cases} \dfrac{D}{v_{adv} - v_{obs}}, & (v_{obs} < v_{adv}) \\ tcc_{max}, & (v_{obs} \geq v_{adv}, \text{ or no obstacle}) \end{cases};$$

wherein, TCC is the passing time cost, $v_{adv}$ is the longitudinal velocity of the vehicle, $v_{obs}$ is the longitudinal velocity of the obstacle, and $tcc_{max}$ is the preset time period, which is a fixed value and greater than the collision time, such as 1000 (here, it is only a numerical value, and the unit is the same as the unit of the collision time, such as seconds or milliseconds). According to this formula, the smaller the longitudinal velocity of the first obstacle in front of the vehicle, the smaller the passing time cost and the worse the trafficability of the corresponding lane. When there is no obstacle in front of the vehicle or the longitudinal velocity of the first obstacle in front of the vehicle is greater than or equal to the longitudinal velocity of the vehicle, the vehicle will not collide with the obstacle in the corresponding lane, and the trafficability of the corresponding lane is the best.

Figure 9:
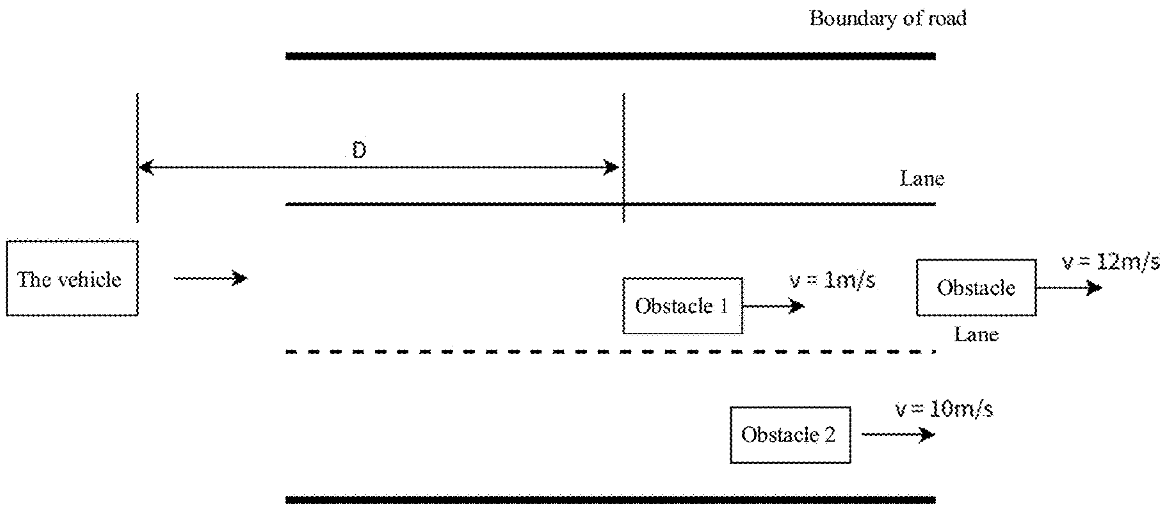
FIG. 9 is a scenario diagram corresponding to a lane passing time cost provided by the embodiments of the present disclosure.

For example, as shown in FIG. 9, in the same lane, the first obstacle in front of the vehicle is the obstacle 1, and in the adjacent lane, the first obstacle in front of the vehicle is the obstacle 2. The longitudinal velocity of the vehicle is 5 m/s, the longitudinal velocity of the obstacle 1 is 1 m/s and the longitudinal velocity of the obstacle 2 is 10 m/s. For the lane of the vehicle, the longitudinal velocity of the obstacle 1 is less than the longitudinal velocity of the vehicle, and the vehicle will collide with the obstacle 1. In this case, a distance D between the vehicle and the obstacle 1 is determined to be 16 m, and a collision time between the vehicle and the obstacle 1 can be determined to be 4 s according to the above formula, so the passing time cost of the lane of the vehicle is 4. For the adjacent lanes, the longitudinal velocity of the obstacle 2 is greater than the longitudinal velocity of the vehicle, and the vehicle and the obstacle 2 will not collide. In this case, the passing time cost of the adjacent lanes is the preset time period, such as 10000. Therefore, it can be determined that the passing time cost of the adjacent lanes is greater than the passing time cost of the lane of the vehicle, that is, the trafficability of the adjacent lanes is better.

In some embodiments, in order to ensure the safety of the vehicle, the safety cost of each lane should be determined at the same time. Correspondingly, when the lane decision semantic information comprises the safety cost, the determining the lane decision semantic information of each lane based on the environmental perception information comprises: determining a lane of the vehicle and other lanes based on the lane information and the vehicle information; for the lane of the vehicle, determining a first preset safety cost as the safety cost; and for the other lanes, in response to that the obstacle enters a danger area of the vehicle within a preset time based on the environmental perception information, determining a second preset safety cost as the safety cost, and in response to that the obstacle does not enter the danger area of the vehicle within the preset time based on the environmental perception information, determining the first preset security cost as the safety cost, wherein the second preset safety cost is different from the first preset safety cost.

Specifically, the environmental perception information comprises the lane information, the vehicle information and the obstacle information. Based on the lane information and the vehicle information, the lane of the vehicle and the other lanes are determined. For the lane of the vehicle, the vehicle has absolute right of way by default, that is, the lane of the vehicle has the highest safety. For the other lanes, the safety of the obstacle in an observation area of the vehicle may be judged. When it is predicted that the obstacle in the observation area of the vehicle will enter the danger area of the vehicle in the future (that is, preset time), it means that the safety of the lane where the obstacle is currently located is low. When it is predicted that the obstacle in the observation area of the vehicle will not enter the danger area of the vehicle in the future, it means that the safety of the lane where the obstacle is currently located is high.

It can be understood that the safety of the lane corresponding to the second preset safety cost is lower than that of the lane corresponding to the first preset safety cost. In some embodiments, the second preset safety cost is less than the first preset safety cost. In some embodiments, a penalty mechanism may be used to assign values to the first preset security cost and the second preset security cost, for example, the first preset security cost is 0 and the second preset security cost is −100,000.

Figure 10:
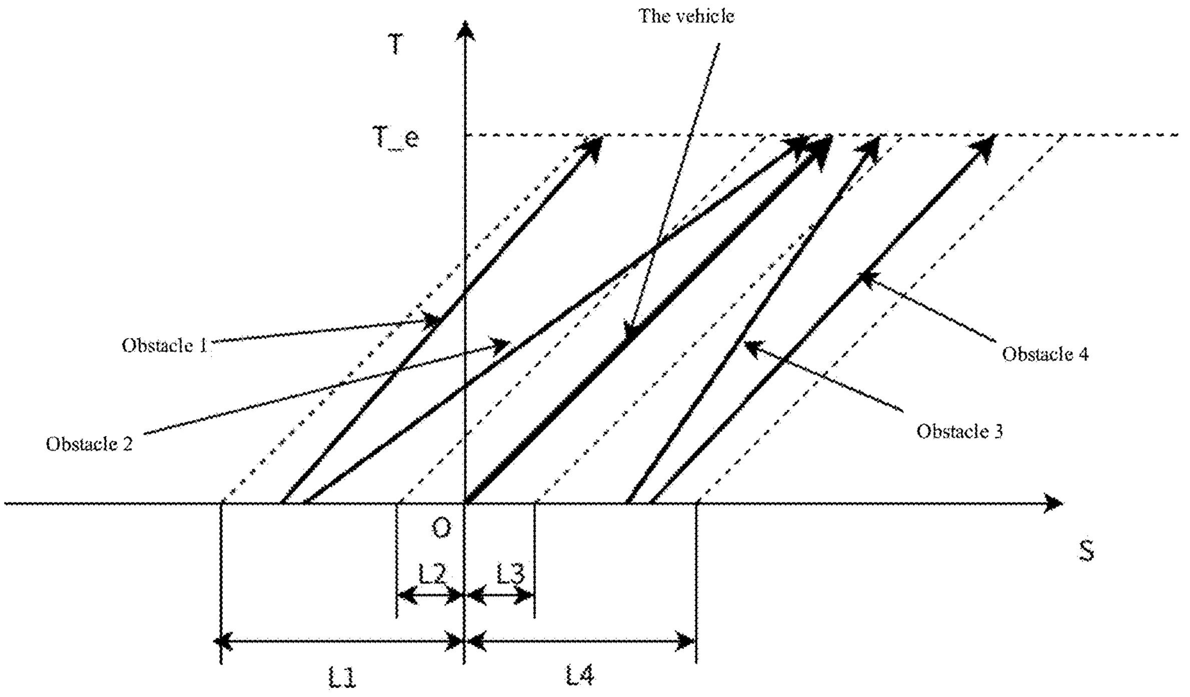
FIG. 10 is an ST diagram of lane safety determining provided by the embodiments of the present disclosure.

Based on the above technical solution, an ST diagram (longitudinal displacement-time diagram) may be used to determine whether obstacles in other lanes will enter the danger area of the vehicle in the future. In some embodiments, an ST diagram curve of the vehicle and an ST diagram curve of obstacles are determined based on the environmental perception information; a danger area of the vehicle is determined based on the ST diagram curve of the vehicle; it is judged whether the ST diagram curve of obstacles overlaps with the danger area of the vehicle within the preset time; if the ST diagram curve of obstacles overlaps with the danger area of the vehicle within the preset time, it is determined that the obstacle enters the danger area of the vehicle within the preset time; otherwise, it is determined that the obstacle does not enter the danger area of the vehicle within the preset time. For example, as shown in FIG. 10, the ST diagram curve of the vehicle is a curve indicated by the vehicle in the figure, and the ST diagram curve of obstacles comprises curves respectively indicated by the obstacle 1, the obstacle 2, the obstacle 3 and the obstacle 4 in the figure. The danger area of the vehicle comprises a danger area behind the vehicle (an area corresponding to an interval L2) and a danger area in front of the vehicle (an area corresponding to an interval L3), and the observation area of the vehicle comprises an observation area behind the vehicle (an area corresponding to an interval L1) and an observation area in front of the vehicle (an area corresponding to an interval L4), and the preset time is T_e. Optionally, L1 is 100 m, L2 is 20 m, L3 is 10 m, L4 is 100 m, and T_e is 6 s. Referring to FIG. 10, according to the ST diagram curve of the vehicle and the ST diagram curve of obstacles, it can be known that the ST diagram curve of obstacles corresponding to the obstacle 2 in the observation area behind the vehicle overlaps with the danger area behind the vehicle within the preset time T_e, the ST diagram curve of obstacles corresponding to the obstacle 1 in the observation area behind the vehicle does not overlap with the danger area behind the vehicle within the preset time T_e, the ST diagram curve of obstacles corresponding to the obstacle 3 in the observation area in front of the vehicle overlaps with the danger area in front of the vehicle within the preset time T_e, and the ST diagram curve of obstacles corresponding to the obstacle 4 in the observation area in front of the vehicle does not overlap with the danger area in front of the vehicle within the preset time T_e. It can be seen that the obstacle 2 and the obstacle 3 enter the danger area of the vehicle within the preset time, and the safety of the lanes where the obstacle 2 and the obstacle 3 are currently located is low, that is, the safety cost of the corresponding lane is the second preset safety cost; while the obstacle 1 and the obstacle 4 do not enter the danger area of the vehicle within the preset time, and the safety of the lanes where the obstacle 1 and the obstacle 4 are currently located is high, that is, the safety cost of the corresponding lane is the first preset safety cost. It should be noted that the ST diagram curve of obstacles overlapping with the danger area of the vehicle comprises that the ST diagram curve of obstacles is completely located in the danger area of the vehicle, or a part of the ST diagram curve of obstacles is located in the danger area of the vehicle. In the above embodiment, in order to simplify the calculation, the obstacle is set to move at a constant velocity, the ST diagram curve of obstacles is a straight line, and the danger area of the vehicle is a parallelogram, both of which are convex hull type graphs. In this way, a collision detection algorithm based on Gilbert-Johnson-Keerthi algorithm may be used to quickly calculate whether the obstacle will enter the danger area of the vehicle within the preset time T_e.

S330: generating the drivable area based on the lane decision semantic information.

For each lane, the embodiments of the present disclosure can generate the drivable area based on the passing time cost and the safety cost at the same time, so that the lane with both trafficability and safety can be selected.

In some embodiments, various costs in the lane decision semantic information may be weighted and summed; and the drivable area is generated based on the weighting and summing result. In such embodiment, the weighting and summing result is obtained by weighting and summing the passing time cost and the safety cost. For example, $$f = w_1 f_{pass} + w_2 f_{safe};$$

wherein, f is the weighting and summing result (or weighting and summing value), $f_{pass}$ is the passing time cost, $f_{safe}$ is the safety cost, $w_1$ is a weight of the passing time cost, and $w_2$ is a weight of the safety cost. $w_1$ and $w_2$ can be obtained according to simulation or actual vehicle test experiments. Based on this technical solution, the embodiments of the present disclosure can determine the lane with the largest weighting and summing value as the drivable area.

Figure 11:
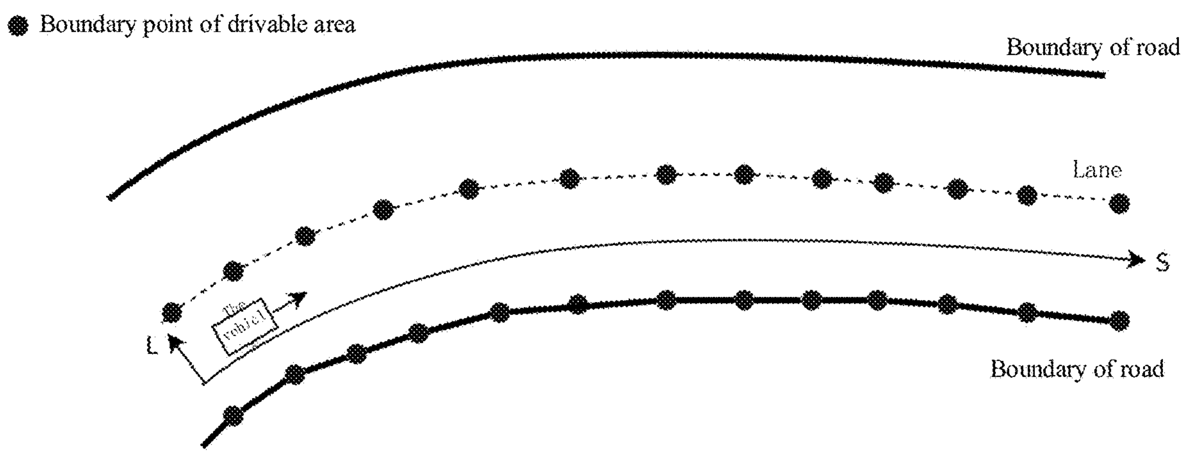
FIG. 11 is a schematic diagram of boundary discretization of a drivable area provided by the embodiments of the present disclosure.

In some embodiments, in order to facilitate a planner to receive this drivable area, a boundary of the drivable area is discretized to form boundary points of the drivable area, comprising left boundary points and right boundary points. For example, the drivable area may be discretized with a fixed resolution based on a Fraine coordinate system. As shown in FIG. 11, according to decision making information of the lane and a curvilinear Fraine coordinate system constructed in a center of the lane, a left boundary and a right boundary of the drivable area are generated with a fixed resolution, wherein the left boundary represents an upper bound of an L value in the Fraine coordinate system and the right boundary represents a lower bound of the L value in the Fraine coordinate system. A longitudinal distance between two adjacent left boundary points or two adjacent right boundary points is the fixed resolution above. FIG. 11 shows that the vehicle is in a right lane, and a result of lane decision-making is also a right lane, so the left and right boundaries of the drivable area are shown in FIG. 11. If the result of result of lane decision-making is changing lane, then the drivable area in this case contains two lanes.

According to the method for generating the drivable area of the vehicle provided by the embodiments of the present disclosure, the lane decision semantic information of each lane is determined according to the environmental perception information, and the lane decision semantic information is converted into a constraint boundary of the drivable area, so that the drivable area with high trafficability and safety can be quickly generated, the generation of the travel trajectory can be accelerated, and the obstacles can be quickly avoided. Meanwhile, passing cost of dynamic obstacles can be characterized by both the passing time cost and the safety cost, and passing cost of static obstacles can also be characterized by the passing time cost. Therefore, the technical solutions of the present disclosure generate the drivable area based on the passing time cost and the safety cost, which can implement the passing planning of the dynamic obstacles and the static obstacles at the same time, and is applicable to the processing of obstacles in a dynamic environment.

Based on the above technical solution, when the drivable area determined based on the lane decision semantic information comprises at least two lanes, and static obstacles exist in at least two lanes, an optimal lane can be further selected according to the passing width cost. In some embodiments, the lane decision semantic information further comprises a passing width cost, and the determining the lane decision semantic information of each lane based on the environmental perception information comprises: determining a minimum passing width of the lane based on the lane information and the static obstacle information; and determining the minimum passing width as the passing width cost. The passing width cost is used to characterize a congestion situation of the lane by static obstacles in front of the vehicle. In some embodiments, the determining the minimum passing width of the lane based on the lane information and the static obstacle information comprises: determining a maximum passing width of each static obstacle on the lane based on the lane information and the static obstacle information; and determining a minimum value of the maximum passing width of each static obstacle as the minimum passing width of the lane.

Figure 12:
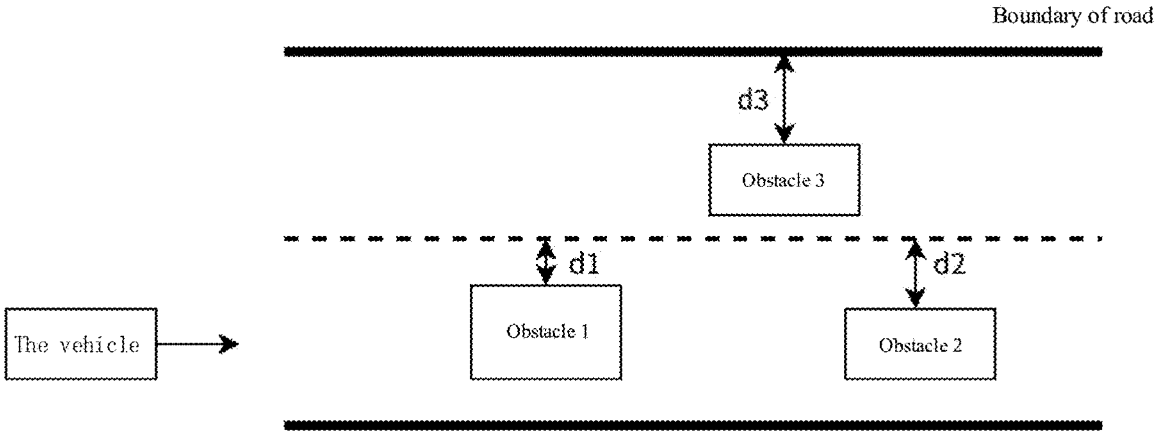
FIG. 12 is a scenario diagram corresponding to a lane width passing cost provided by the embodiments of the present disclosure.

Specifically, a Fraine coordinate system is established, and each static obstacle is projected into the Fraine coordinate system to generate an SL bounding box of each obstacle. For each lane, a left passing width and a right passing width of each static obstacle are calculated, a maximum passing width of each static obstacle is determined from the left passing width and the right passing width, and a minimum maximum passing width is selected from the maximum passing widths of all the static obstacles as the minimum passing width of the lane, and the minimum passing width is determined as the passing width cost. The greater the passing width cost, the less the static obstacles congests the lane. For example, as shown in FIG. 12, the lane of the vehicle comprises the obstacle 1 and the obstacle 2, and the adjacent lanes comprises the obstacle 3 (the obstacle 1, the obstacle 2 and the obstacle 3 are all static obstacles). The maximum passing width of the obstacle 1 is d1, the maximum passing width of the obstacle 2 is d2, and the maximum passing width of the obstacle 3 is d3, wherein d1 is smaller than d2 and d2 is smaller than d3, so the minimum passing width of the lane of the vehicle is d1, that is, the passing width cost of the lane of the vehicle is d1, and the minimum passing width of the adjacent lane is d3, that is, the passing width cost of the adjacent lane is d3. In this case, an obstacle congestion degree of the adjacent lane is less than an obstacle congestion degree of the lane of the vehicle. Therefore, the adjacent lane may be further selected to generate a drivable area.

Based on the above technical solution, when an optimal drivable area cannot be determined based on various costs in the lane decision semantic information, in order to ensure the stability of the travel trajectory of the vehicle, the lane of the vehicle is preferably selected to generate the drivable area by adding the stability cost in the lane decision semantic information. Correspondingly, in some embodiments, the lane decision semantic information further comprises a stability cost, and the determining the lane decision semantic information of each lane based on the environmental perception information comprises: determining a lane of the vehicle and other lanes based on the lane information and the vehicle information; for the lane of the vehicle, determining a first preset safety cost as the safety cost; and for other lanes, determining a second preset stability cost as the stability cost, wherein the second preset stability cost is different from the first preset stability cost. In the technical solution, the first preset stability cost may be greater than the second preset stability cost, wherein the first preset stability cost may be 100 and the second preset stability cost may be 0.

Based on the above embodiments, the weighting and summing the various costs in the lane decision semantic information to obtain the weighting and summing result can be calculated by the following formula:

$$f = w_1 f_{pass} + w_2 f_{safe} + w_3 f_{narrow} + w_4 f_{stable};$$

wherein, $f_{narrow}$ is the passing width cost, $f_{stable}$ is the stability cost, $w_3$ is a weight of the passing width cost, and $w_4$ is a weight of the stability cost.

Based on the above technical solution, in some embodiments, after the generating the drivable area based on the lane decision semantic information, the method further comprises at least one of the following: updating the drivable area based on a preset traffic rule; updating the drivable area based on kinematic and dynamic constraints of the vehicle; updating the drivable area based on the obstacle semantic information and the preset safe area, wherein the preset safe area is connected with the drivable area; and updating the drivable area based on the static obstacle information, the obstacle decision-making semantic information and a light tracing algorithm, wherein the obstacle decision-making semantic information comprises passing from a left side of the obstacle or passing from a right side of the obstacle.

Figure 13:
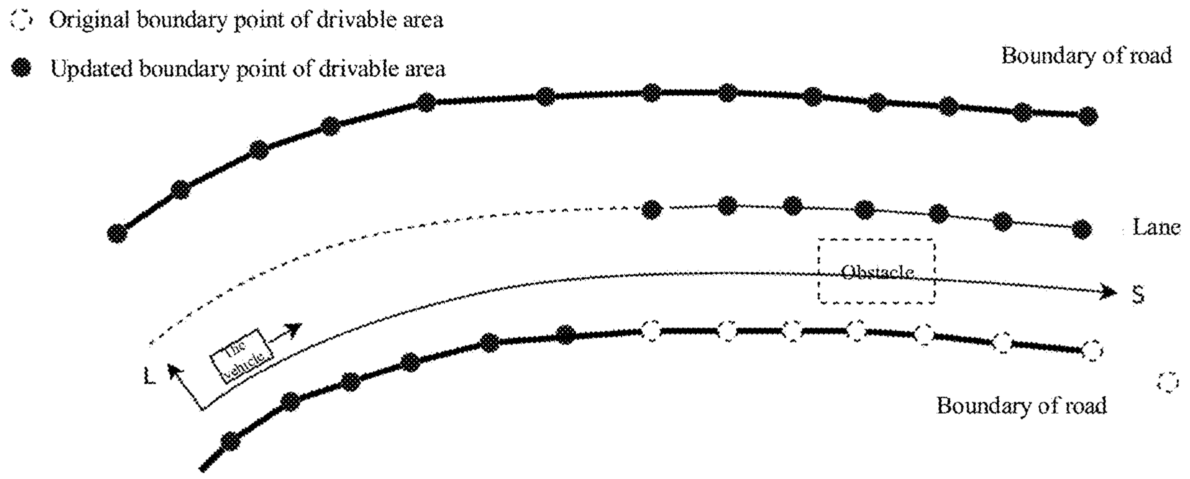
FIG. 13 is a schematic diagram of updating the drivable area based on a preset traffic rule provided by the embodiments of the present disclosure.

Specifically, in some embodiments, whether the drivable area violates a traffic rule can be judged based on the preset traffic rule, and then the drivable area that violates the traffic rule can be trimmed to update the drivable area. In the embodiments of the present disclosure, the preset traffic rule may comprise common traffic rules such as dotted and solid yellow lines, dotted and solid white lines and lane indicator lines. For example, as shown in FIG. 13, after the lane decision making, the vehicle will choose to change lanes, so the two lanes in the lane change process are first used as the drivable area, that is, the original drivable area. However, because a tail end of the lane is a solid line, the drivable area will be trimmed based on the preset traffic rule, and the drivable area defined by a black dot in FIG. 13, that is, the updated drivable area, will be obtained.

Figure 14:
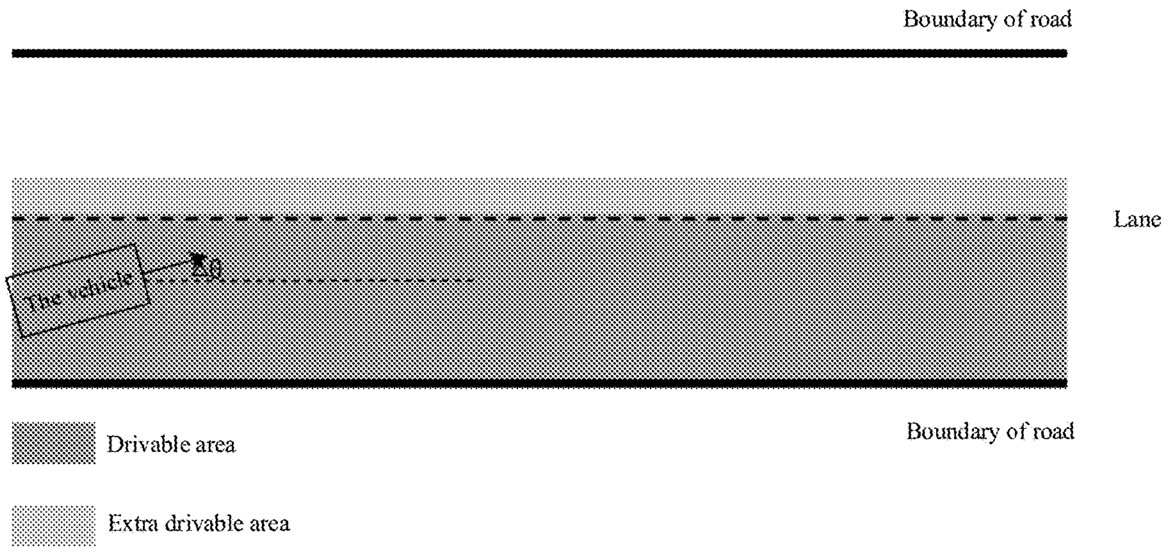
FIG. 14 is a schematic diagram of updating the drivable area with kinematic and dynamic constraints of a vehicle provided by the embodiments of the present disclosure.

In some embodiments, the technical solution of the present disclosure may also update the drivable area based on kinematic and dynamic constraints of the vehicle. For example, based on the kinematic and dynamic constraints of the vehicle, the drivable area is updated by adding an extra drivable area when the vehicle temporarily borrows the road. As shown in FIG. 14, an included angle between a heading angle of the vehicle and a heading angle of a road network is $\Delta\theta$, a curvature of the vehicle at the position point of the lane of the vehicle is $k_r$, and an L coordinate value of the vehicle in the Fraine coordinate system is d. Therefore, according to a Fraine kinematical equation, a transverse velocity of the vehicle relative to the Fraine coordinate system is $d=(1-k_r d)\tan(\Delta\theta)$, and a transverse acceleration is:

$$d'' = -(k_r' d + k_r d')\tan(\Delta\theta) + \frac{1-k_r d}{\cos^2(\Delta\theta)}\left(k_{ADV}\frac{1-k_r d}{\cos(\Delta\theta)} - k_r\right);$$

wherein $k_{ADV}$ is a trajectory curvature of the vehicle calculated by using a wheel angle $\delta$ of an unmanned bicycle model, a wheel base of the vehicle is B, then, $$k_{ADV} = \frac{\tan\delta}{B}$$

and $k'_r$ are a curvature change rate of the road network. For approximate calculation, in order to calculate the extra driving area $d_{extra}$, it is assumed that the final Fraine transverse velocity of the vehicle is 0, so there is $$d_{extra} = \frac{d'^2}{2d''}$$

based on Fraine coordinate system kinematics. In this way, the drivable area is extended outwards through the calculated additional drivable area to update the drivable area.

In some embodiments, the absolute safety of the drivable area cannot be guaranteed due to the influence of the dynamic obstacles on the drivable area that may exist in the adjacent lanes. Therefore, a part of the drivable area that may be affected by the dynamic obstacles can be trimmed to ensure the safety of the remaining drivable area.

Figure 15:
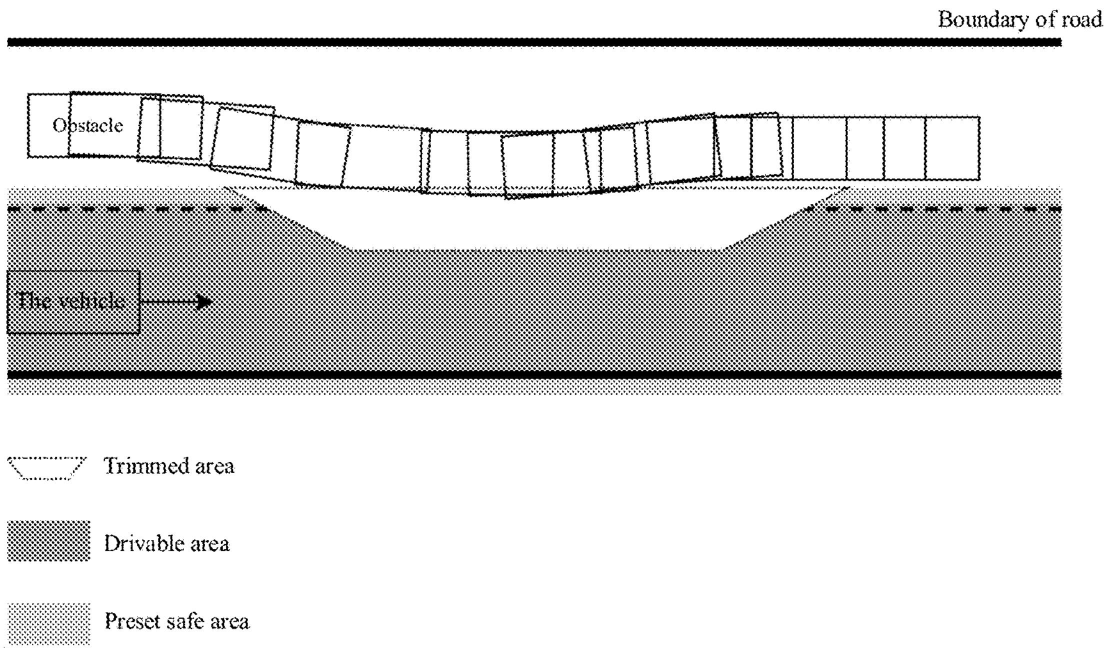
FIG. 15 is a schematic diagram of updating the drivable area based on obstacle semantic information and a preset safe area provided by the embodiments of the present disclosure.

Specifically, an obstacle needing to be avoided laterally is determined based on the obstacle semantic information. If the moving trajectory of the obstacle needing to be avoided laterally occupies a preset safety area, a part of the drivable area occupying a corresponding position of the preset safety area is trimmed. In such embodiment, the obstacle semantic information may comprise information used to characterize a motion state of obstacles, such as obstacle line-merging, obstacle crossing, obstacle parallel driving and reverse driving. The vehicle will automatically judge whether it is necessary to avoid obstacles horizontally based on the obstacle semantic information. For example, if obstacle line-merging is determined based on the based on the obstacle semantic information, the vehicle does not need to avoid the obstacles laterally, and if it is determined that the obstacle is too close to the lane of the vehicle based on the obstacle semantic information, the vehicle needs to avoid the obstacles laterally. For example, as shown in FIG. 15, preset safe areas are added on both sides of the drivable area (if the drivable area is adjacent to the road boundary, the preset safety area can be added only on an inner side of the drivable area), and it is judged whether the moving trajectory of the obstacle output by an obstacle prediction module (prior module, not involved in the present disclosure) occupies the preset safe area. If the moving trajectory occupies the preset safety area, the part of the drivable area occupying the corresponding position of the preset safety area, such as the trimmed area in FIG. 15, is trimmed, so as to update the drivable area.

In some embodiments, the drivable area obtained from the above embodiments still contains the area where static obstacles are located, which does not meet the obstacle avoidance constraint, so it is necessary to further trim the area where the static obstacles are located from the drivable area to update the drivable area. In order to avoid the problem that the Fraine bounding box is used to generate approximate drivable areas to reduce the trafficability of the vehicle in the existing solutions, the technical solution of the present disclosure combines the obstacle decision-making semantic information and the light tracing algorithm to accurately determine the area where the static obstacles are located.

Specifically, the updating the drivable area based on the static obstacle information, the obstacle decision-making semantic information and the light tracing algorithm comprises: determining a collision point between the light and the obstacle based on the static obstacle information, the obstacle decision-making semantic information and the light tracing algorithm, wherein the collision point is located in the drivable area; and updating the drivable area based on the collision point. In some embodiments, the determining the collision point between the light and the obstacle based on the static obstacle information, the obstacle decision-making semantic information and the light tracing algorithm comprises: determining a light source point and a light projection direction based on the obstacle decision-making semantic information; determining a light projection scope based on the static obstacle information; scanning the obstacle with light based on the light source point, the light projection direction and the light projection scope; and determining the collision point between the light and the obstacle. In some embodiments, the light tracing algorithm can adopt a light projection algorithm based on Gilbert-Johnson-Keerthi algorithm to improve solving precision.

Illustratively, the obstacle decision-making semantic information comprises passing from a left side of the obstacle or passing from a right side of the obstacle. When the obstacle decision-making semantic information is passing through the left side of the obstacle, it is determined that the light source point is locate on the left side of the static obstacle, and the light projection direction is perpendicular to the passing direction of the lane and faces the static obstacle. When the obstacle decision-making semantic information is passing through the right side of the obstacle, it is determined that the light source point is locate on the right side of the static obstacle, and the light projection direction is perpendicular to the passing direction of the lane and faces the static obstacle. Based on the static obstacle information, such as the position information and size information of the static obstacle, the area where the static obstacle is located can be determined, so as to determine the light projection scope. After determining the collision point between the light and the obstacle, the drivable area defined by each collision point is trimmed off. The embodiments of the present disclosure do not limit the specific position of the light source point, and in some embodiments, the light source point may be located at the boundary point of the drivable area.

Figure 16:
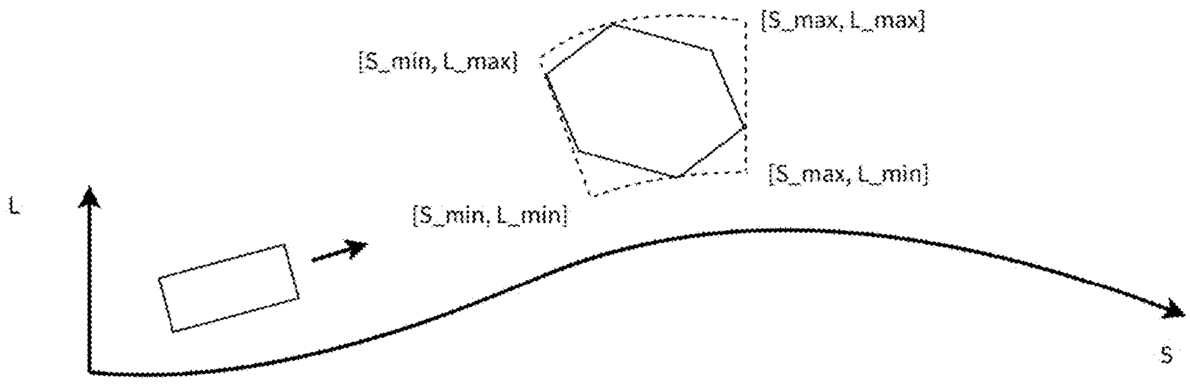
FIG. 16 is schematic diagram of generating a frenet bounding box provided by the embodiments of the present disclosure.
Figure 17:
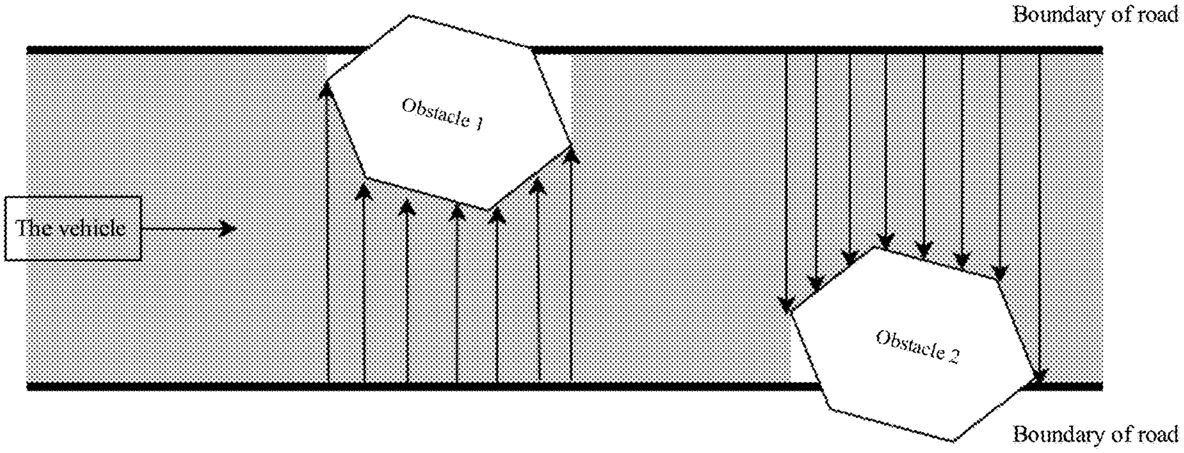
FIG. 17 is a schematic diagram of updating the drivable area based on static obstacle information, obstacle decision-making semantic information and light tracing algorithm provided by the embodiments of the present disclosure.

In a specific embodiment, as shown in FIG. 16, a frenet bounding box box_s1={S_min, S_max, L_min, L_max} of the static obstacle may be determined first, and an ID scope of the static obstacle in a longitudinal direction of the drivable area is determined based on the frenet bounding box. When a resolution of the boundary point of the driving area is Δs, the above-mentioned ID scope is (id_start, id_end), that is, the light projection scope, wherein id_start=floor(s_min/Δs),id_end=ceil(s_max/Δs), floor indicates an operation of rounding down a floating point number, and ceil indicates an operation of rounding up the floating point number. It should be noted that the embodiment of the present disclosure only uses the frenet bounding box to determine the light projection scope that may contain the whole static obstacle, so as to ensure the complete scanning of the obstacle by light, and the collision point determined later is located on the static obstacle, not on the boundary of the frenet bounding box. As shown in FIG. 17, the drivable area contains two static obstacles, i.e., the obstacle 1 and the obstacle 2. According to the obstacle decision-making semantic information of the obstacle 1, it can be determined that the vehicle passes through the right side of the obstacle 1, and according to the obstacle decision-making semantic information of the obstacle 2, it can be determined that the vehicle passes through the left side of the obstacle 2. Taking the obstacle 1 as an example, based on the obstacle decision-making semantic information of the obstacle 1, it is determined that the point light source is located at the right boundary point of the drivable area, and based on the static obstacle information of the obstacle 1, the light projection scope of the light source to the obstacle 1, that is, the above ID scope, is determined, so that the point light source can scan the obstacle 1 in sequence according to the ID scope. Specifically, when the light collides with the obstacle 1, if the collision point is within the drivable area, the drivable area on the side of the collision point far from the point light source is trimmed until the scanning of the light projection scope is completed. By adopting the technical solution above, under the condition that the drivable area meets the obstacle avoidance constraint, the precision of solving the area occupied by the static obstacles in the drivable area can be improved, and the trafficability of the vehicle can be improved.

The embodiments of the present disclosure further provide a vehicle decision-making planning apparatus. Referring to FIG. 2, the vehicle decision-making planning apparatus comprises a base coordinate system generator 111, a guide line generator 112, an obstacle decision maker 113 and a driving space generator 114.

The base coordinate system generator 111 is configured for generating a base coordinate system; the guide line generator 112 is configured for generating a guide line in the base coordinate system to determine an approximate travel trajectory of a vehicle in the future; the obstacle decision maker 113 is configured for performing obstacle decision-making under the constraint of the guide line; and the driving space generator 114 is configured for generating a drivable area based on the obstacle decision-making.

Figure 18:
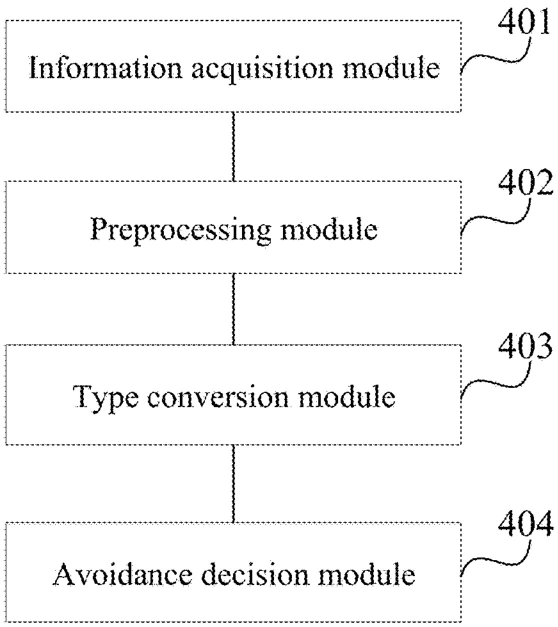
FIG. 18 is a block diagram of functional modules of an obstacle decision maker in a vehicle decision-making planning apparatus provided by the embodiments of the present disclosure.

FIG. 18 is a block diagram of functional modules of an obstacle decision maker in the vehicle decision-making planning apparatus provided by the embodiments of the present disclosure. As shown in FIG. 18, the obstacle decision maker (or a decision-making apparatus for obstacle avoidance) comprises an information acquisition module 401, a preprocessing module 402, a type conversion module 403 and an avoidance decision module 404.

The information acquisition module 401 is configured for acquiring road information, first grid obstacle information of a first grid obstacle, and first convex hull obstacle information of a first convex hull obstacle;

the preprocessing module 402 is configured for obtaining a second grid obstacle by preprocessing the first grid obstacle based on the road information and the first grid obstacle information, wherein a number of the second grid obstacle is less than a number of the first grid obstacle;

the type conversion module 403 is configured for converting the second grid obstacle into a second convex hull obstacle; and the avoidance decision module 404 is configured for making an avoidance decision for avoiding a target convex hull obstacle based on target convex hull obstacle information of the target convex hull obstacle, wherein the target convex hull obstacle comprises the first convex hull obstacle and/or the second convex hull obstacle.

In some embodiments, the processing unit 402 comprises:

an obstacle filtering unit configured for filtering out the first grid obstacle outside a road based on the road information and the first grid obstacle information; and taking a remaining part of the first grid obstacle as the second grid obstacle; and/or, an obstacle aggregating unit configured for determining the first grid obstacle located in the road based on the road information and the first grid obstacle information; aggregating the first grid obstacle located in the road; and taking the aggregated first grid obstacle as the second grid obstacle.

In some embodiments, the obstacle filtering unit comprises:

a road bounding box generation subunit configured for generating a road bounding box along a road passing direction based on the road information;

a grid obstacle bounding box generation subunit configured for generating a grid obstacle bounding box of the first grid obstacle based on the first grid obstacle information;

a first grid obstacle subunit configured for determining the first grid obstacle located outside the road based on the grid obstacle bounding box and the road bounding box; and a first grid obstacle filtering subunit configured for filtering out the first grid obstacle located outside the road.

In some embodiments, the road bounding box generation subunit is specifically configured for:

Discretizing a road boundary into boundary points based on the road information; and generating the road bounding box based on the boundary points.

In some embodiments, the road bounding box generation subunit is specifically configured for:

determining the road boundary and a curvature of the road boundary; and discretizing the road boundary based on the curvature of the road boundary to obtain boundary point groups arranged at intervals along a road passing direction, wherein each boundary point group comprises left boundary points and right boundary points corresponding in a transverse direction, and the transverse direction is perpendicular to the road passing direction.

In some embodiments, the road bounding box generation subunit is specifically configured for:

generating a rectangular frame passing through each boundary point in any two adjacent boundary point groups based on any two adjacent boundary point groups, and taking the rectangular frame as the road bounding box.

In some embodiments, the road bounding box generation subunit is specifically configured for:

taking a current position of the vehicle as an initial road point;

acquiring one boundary point group corresponding to the initial road point in the transverse direction;

selecting next road point along the road passing direction based on the curvature of the road boundary, wherein a distance between two adjacent road points is negatively correlated with the curvature of the road boundary; and taking the next road point as the initial road point, returning to executing the step of acquiring one boundary point group corresponding to the initial road point in the transverse direction until a distance from last next road point to the current position of the vehicle in the road passing direction is greater than a preset distance threshold, and determining all the currently acquired boundary point groups as the boundary point groups.

In some embodiments, the grid obstacle bounding box generation subunit is specifically configured for:

generating a grid obstacle contour of the first grid obstacle based on the first grid obstacle information; and generating a grid obstacle bounding box based on the grid obstacle contour.

In some embodiments, the first grid obstacle subunit is specifically configured for:

for each grid obstacle bounding box, determining a target road bounding box with a smallest Euclidean distance to the grid obstacle bounding box from the road bounding box based on the grid obstacle bounding box and the road bounding box;

performing collision detection on the grid obstacle bounding box and the corresponding target road bounding box; and if the grid obstacle bounding box does not collide with the corresponding target road bounding box, determining that the first grid obstacle corresponding to the grid obstacle bounding box is located outside the road.

In some embodiments, the apparatus further comprises:

a first grid obstacle position determination module configured for, if the grid obstacle bounding box does not collide with the corresponding target road bounding box, determining whether the first grid obstacle corresponding to the grid obstacle bounding box is located outside the road.

In some embodiments, the first grid obstacle position determination module is specifically configured for:

performing collision detection based on the boundary point of the target road bounding box and the grid obstacle bounding box through a vector cross product, and determining whether the first grid obstacle corresponding to the grid obstacle bounding box is located outside the road.

In some embodiments, the first grid obstacle position determination module is specifically configured for:

determining a boundary point vector;

determining a vertex vector of the grid obstacle bounding box; and when a cross product of the vertex vector of the grid obstacle bounding box and the boundary point vector is greater than 0, determining that the first grid obstacle corresponding to the grid obstacle bounding box is located outside the road.

In some embodiments, the first grid obstacle position determination module is specifically configured for:

determining a boundary point vector;

determining a vertex vector of the grid obstacle bounding box; and when a cross product of the vertex vector of the grid obstacle bounding box and the boundary point vector is less than or equal than 0, determining that the first grid obstacle corresponding to the grid obstacle bounding box is located in the road.

In some embodiments, the obstacle aggregating unit comprises:

a first obstacle bounding box generation subunit configured for generating a first obstacle bounding box of the first grid obstacle based on the first grid obstacle information of the first grid obstacle located in the road;

a second obstacle bounding box generation subunit configured for merging two adjacent first obstacle bounding boxes to generate a second obstacle bounding box when the Euclidean distance between the two adjacent first obstacle bounding boxes is smaller than a width of the vehicle; and a return execution unit configured for taking the second obstacle bounding box as the first obstacle bounding box, and returning to execute the step of merging the two adjacent first obstacle bounding boxes to generate the second obstacle bounding box when the Euclidean distance between the two adjacent first obstacle bounding boxes is smaller than the width of the vehicle until the Euclidean distance between the second obstacle bounding box and the adjacent first obstacle bounding box is greater than or equal to the width of the vehicle or no first obstacle bounding box is adjacent to the second obstacle bounding box.

In some embodiments, the avoidance decision module 404 comprises:

a first decision making unit configured for marking an avoidance-free label or a lateral avoidance-free label on the target convex hull obstacle meeting a preset filtering condition based on the target convex hull obstacle information; and/or, a second decision making unit configured for marking an avoidance label on the target convex hull obstacle based on the target convex hull obstacle information and a guide line of the vehicle, wherein the avoidance label comprises a left passing label, a right passing label or a following label.

In some embodiments, the preset filtering condition comprises at least one of the following:

the target convex hull obstacle is located outside the road;

a motion state of the target convex hull obstacle meets a lateral avoidance-free condition; and the target convex hull obstacle is located on the guide line of the vehicle.

In some embodiments, the first decision making unit is specifically configured for:

when the target convex hull obstacle is located outside the road, marking the avoidance-free label on the target convex hull obstacle; and when the motion state of the target convex hull obstacle meets the lateral avoidance-free condition or the target convex hull obstacle is located on the guide line of the vehicle, marking the lateral avoidance-free label on the target convex hull obstacle.

In some embodiments, the lateral avoidance-free condition comprises any one of the following:

the target convex hull obstacle crosses the road;

the target convex hull obstacle changes lane to the lane of the vehicle; and a longitudinal velocity of the target convex hull obstacle is greater than a velocity of the vehicle.

In some embodiments, the second decision making unit is specifically configured for:

if the target convex hull obstacle is located on the guide line of the vehicle, marking the following label on the target convex hull obstacle; and if the target convex hull obstacle is not located on the guide line of the vehicle, when a center of mass of the target convex hull obstacle is located at a left side of the guide line of the vehicle, marking the right passing label on the target convex hull obstacle, and when the center of mass of the target convex hull obstacle is located on a right side of the guide line of the vehicle, marking the left passing label on the target convex hull obstacle.

Figure 19:
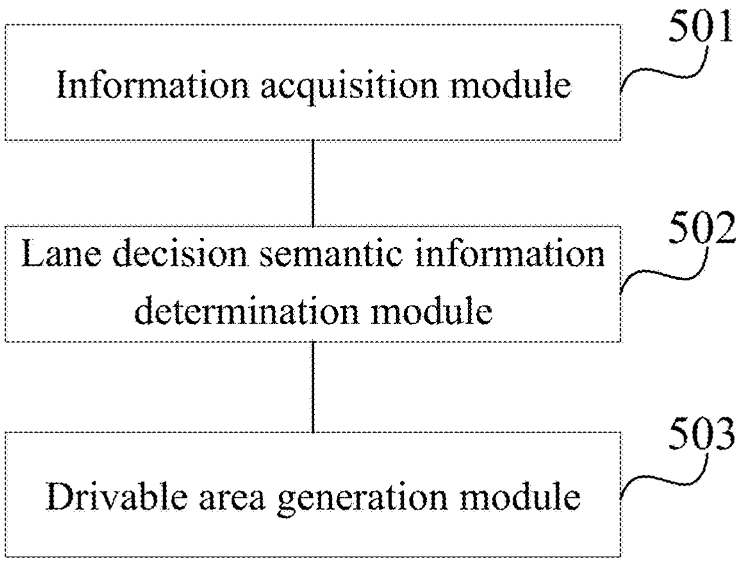
FIG. 19 is a block diagram of functional modules of a driving space generator in the vehicle decision-making planning apparatus provided by the embodiments of the present disclosure.

FIG. 19 is a block diagram of functional modules of a driving space generator in the vehicle decision-making planning apparatus provided by the embodiments of the present disclosure. As shown in FIG. 19, the driving space generator (or an apparatus for generating a drivable area of a vehicle) comprises a perception information acquisition module 501, a lane decision semantic information determination module 502 and a drivable area generation module 503.

The perception information acquisition module 501 is configured for acquiring environmental perception information, wherein the environmental perception information comprises at least two of lane information, obstacle information and vehicle information, and the obstacle information comprises static obstacle information and/or dynamic obstacle information;

the lane decision semantic information determination module 502 is configured for determining lane decision semantic information of each lane based on the environmental perception information, wherein the lane decision semantic information comprises a passing time cost and a safety cost; and the drivable area generation module 503 is configured for generating the drivable area based on the lane decision semantic information.

In some embodiments, when the lane decision semantic information comprises a passing time cost, the lane decision semantic information determination module 502 is specifically configured for:

for each lane, determining a collision time between the vehicle and a first obstacle in front of the vehicle based on the environmental perception information; and determining the collision time as the passing time cost.

In some embodiments, the lane decision semantic information determination module 502 is also configured for:

if it is determined that there is no obstacle in front of the vehicle or a longitudinal velocity of the first obstacle in front of the vehicle is greater than or equal to a longitudinal velocity of the vehicle based on the environmental perception information, a preset time period is determined as the passing time cost.

In some embodiments, when the lane decision semantic information comprises a safety cost, the lane decision semantic information determination module 502 is specifically configured for:

determining the lane of the vehicle and other lanes based on the lane information and the vehicle information;

for the lane of the vehicle, determining a first preset safety cost as the safety cost; and for the other lanes, if it is determined that the obstacle enters a danger area of the vehicle within a preset time based on the environmental perception information, determining a second preset safety cost as the safety cost, and in response to that the obstacle does not enter the danger area of the vehicle within the preset time based on the environmental perception information, determining the first preset security cost as the safety cost, wherein the second preset safety cost is different from the first preset safety cost.

In some embodiments, the lane decision semantic information determination module 502 is specifically configured for:

determining an ST diagram curve of the vehicle and an ST diagram curve of obstacles based on the environmental perception information;

determining a danger area of the vehicle based on the ST diagram curve of the vehicle;

judging whether the ST diagram curve of obstacles overlaps with the danger area of the vehicle within the preset time; and if the ST diagram curve of obstacles overlaps with the danger area of the vehicle within the preset time, determining that the obstacle enters the danger area of the vehicle within the preset time; otherwise, determining that the obstacle does not enter the danger area of the vehicle within the preset time.

In some embodiments, the lane decision semantic information further comprises a passing width cost, and the lane decision semantic information determination module 502 is specifically configured for:

determining a minimum passing width of the lane based on the lane information and the static obstacle information; and determining the minimum passing width as the passing width cost.

In some embodiments, the lane decision semantic information determination module 502 is specifically configured for:

determining a maximum passing width of each static obstacle on the lane based on the lane information and the static obstacle information; and determining a minimum value of the maximum passing width of each static obstacle as the minimum passing width of the lane.

In some embodiments, the lane decision semantic information further comprises a stability cost, the lane decision semantic information determination module 502 is specifically configured for:

determining the lane of the vehicle and other lanes based on the lane information and the vehicle information;

for the lane of the vehicle, determining a first preset stability cost as the stability cost; and for other lanes, determining a second preset stability cost as the stability cost, wherein the second preset stability cost is different from the first preset stability cost.

In some embodiments, the drivable area generation module 503 is specifically configured for:

weighting and summing various costs in the lane decision semantic information; and generating the drivable area based on a weighting and summing result.

In some embodiments, the apparatus above further comprises:

a discretizing module configured for discretizing a boundary of the drivable area after generating the drivable area based on the lane decision semantic information.

In some embodiments, the apparatus above further comprises a drivable area updating module. The drivable area updating module, after generating the drivable area based on the lane decision semantic information, is specifically configured for at least one of the following updating operations:

updating the drivable area based on a preset traffic rule;

updating the drivable area based on kinematic and dynamic constraints of the vehicle;

updating the drivable area based on the obstacle semantic information and the preset safe area, wherein the preset safe area is connected with the drivable area; and updating the drivable area based on the static obstacle information, the obstacle decision-making semantic information and a light tracing algorithm, wherein the obstacle decision-making semantic information comprises passing from a left side of the obstacle or passing from a right side of the obstacle.

In some embodiments, the drivable area updating module is specifically configured for:

determining an obstacle needing to be avoided laterally based on the obstacle semantic information; and when a moving trajectory of the obstacle needing to be avoided laterally occupies a preset safety area, trimming a part of the drivable area occupying a corresponding position of the preset safety area.

In some embodiments, the drivable area updating module is specifically configured for:

determining a collision point between the light and the obstacle based on the static obstacle information, the obstacle decision-making semantic information and the light tracing algorithm, wherein the collision point is located in the drivable area; and updating the drivable area based on the collision point.

In some embodiments, the drivable area updating module is specifically configured for:

determining a light source point and a light projection direction based on the obstacle decision-making semantic information;

determining a light projection scope based on the static obstacle information;

scanning the obstacle with light based on the light source point, the light projection direction and the light projection scope; and determining the collision point between the light and the obstacle.

The vehicle decision-making planning apparatus disclosed in the above embodiment can execute the vehicle decision-making planning methods disclosed in the above embodiments, and have the same or corresponding beneficial effects, which will not be discussed in further detail here for avoiding repetition.

The embodiments of the present disclosure further provide an electronic device, comprising: a memory and one or more processors; wherein the memory is in communication connection with the one or more processors, the memory stores instructions executable by the one or more processors, and when the instructions are executed by the one or more processors, the electronic device is configured for implementing the method described by any embodiment of the present disclosure.

Figure 20:
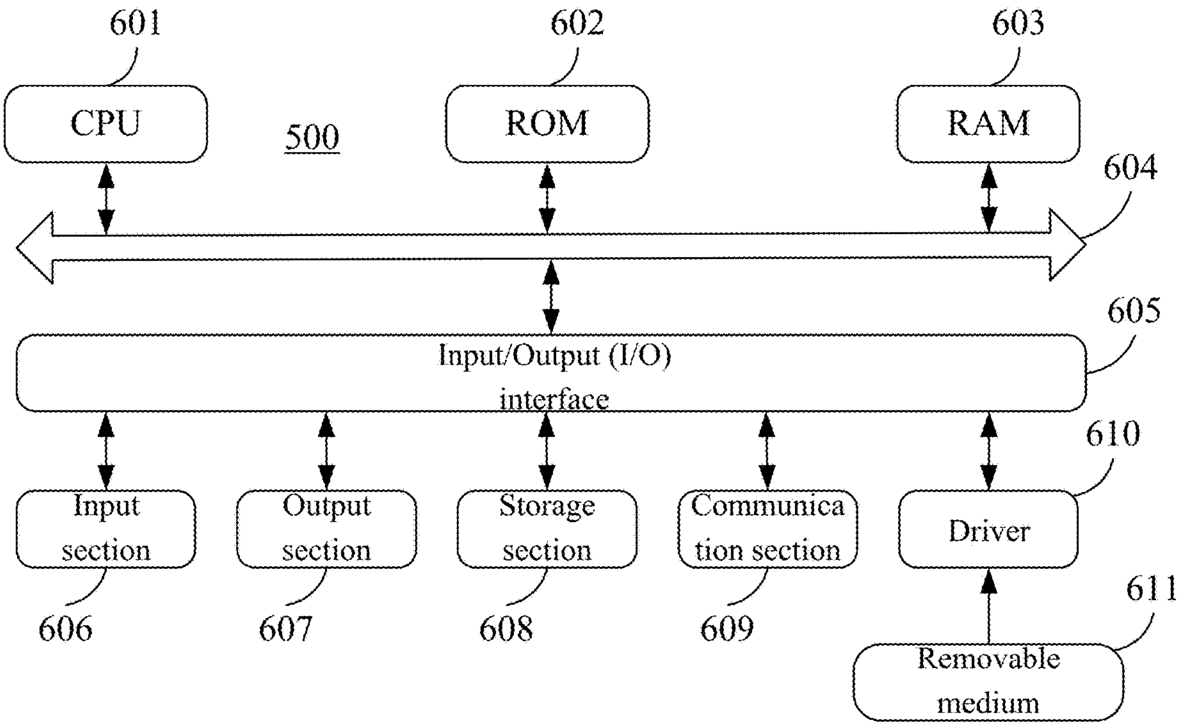
FIG. 20 is a schematic structural diagram of an electronic device suitable for implementing the embodiments of the present disclosure.

FIG. 20 is a schematic structural diagram of an electronic device suitable for implementing the embodiments of the present disclosure. As shown in FIG. 20, the electronic device 600 comprises a Central Processing Unit (CPU) 601, which can perform various processes in the aforementioned embodiments according to a program stored in a Read Only Memory (ROM) 602 or a program loaded into a Random Access Memory (RAM) 603 from a storage section 608. In the RAM 603, various programs and data needed for operating the device 600 may also be stored. The CPU 601, the ROM 602 and the RAM 603 are connected to each other through a bus 604. An Input/Output (I/O) interface 605 is also connected to the bus 604.

The following components are connected to the I/O interface 605: an input section 606 comprising a keyboard, a mouse, and the like; an output section 607 comprising a Cathode Ray Tube (CRT), a Liquid Crystal Display (LCD), a loud speaker, and the like; a storage section 608 comprising a hard disk, and the like; and a communication section 609 comprising a network interface card such as an LAN card, a modem, and the like. The communication section 609 performs communication processing via a network such as the Internet. The driver 610 is also connected to the I/O interface 605 as needed. A removable medium 611, such as a magnetic disk, an optical disk, a magnetic-optical disk, a semiconductor memory, and the like, is installed on the driver 610 as needed, so that a computer program read from the removable medium can be installed into the storage section 608 as needed.

In particular, according to the embodiments of the present disclosure, the method described above can be implemented as a computer software program. For example, the embodiments of the present disclosure comprise a computer program product, which comprises a computer program tangibly embodied on a readable medium thereof, and the computer program comprises a program code for executing the aforementioned method for obstacle avoidance. In such embodiments, the computer program can be downloaded and installed from the network through the communication section 609 and/or installed from the removable medium 611.

The flowcharts and block diagrams in the drawings illustrate architectures, functions and operations of possible implementations of the apparatuses, methods and computer program products according to various embodiments of the present disclosure. In this regard, each block in the flowchart or block diagram may represent one module, one program segment, or a part of code. The module, the program segment, or the part of code contains one or more executable instructions for implementing specified logical functions. It should also be noted that in some alternative implementations, the functions noted in the blocks may also occur in a different order from those noted in the drawings. For example, two consecutive blocks may actually be executed in substantially parallel, and sometimes may be executed in reverse order, depending on the functions involved. It should also be noted that each block in the block diagrams and/or flowcharts, and combinations of the blocks in the block diagrams and/or flowcharts, may be implemented with dedicated hardware-based systems that perform specified functions or actions, or may be implemented with combinations of dedicated hardware and computer instructions.

The units or modules described in the embodiments of the present disclosure can be realized by software or hardware. The described units or modules can also be arranged in the processor, and the names of these units or modules do not constitute the limitation of the units or modules themselves in some cases.

Moreover, the embodiments of the present disclosure also provide a computer readable storage medium. The computer readable storage medium may be the computer readable storage medium comprised in the apparatus according to the above embodiment. The computer readable storage medium can also be a computer readable storage medium that exists alone and is not assembled into the apparatus. The computer readable storage medium is stored with a computer-executable instruction which, when being executed by a computing device, implements the method described in any embodiment of the present disclosure.

The generating the road bounding box along the road passing direction based on the road information comprises:

Discretizing a road boundary into boundary points based on the road information; and generating the road bounding box based on the boundary point.

The discretizing the road boundary into the boundary points based on the road information comprises:

determining the road boundary and a curvature of the road boundary based on the road information; and discretizing the road boundary based on the curvature of the road boundary to obtain boundary point groups arranged at intervals along a road passing direction, wherein each boundary point group comprises left boundary points and right boundary points corresponding in a transverse direction, and the transverse direction is perpendicular to the road passing direction.

The generating the road bounding box based on the boundary point comprises:

generating a rectangular frame passing through each boundary point in any two adjacent boundary point groups based on any two adjacent boundary point groups, and taking the rectangular frame as the road bounding box.

The discretizing the road boundary based on the curvature of the road boundary to obtain the boundary point groups arranged at intervals along the road passing direction comprises:

taking a current position of the vehicle as an initial road point;

acquiring one boundary point group corresponding to the initial road point in the transverse direction;

selecting next road point along the road passing direction based on the curvature of the road boundary, wherein a distance between two adjacent road points is negatively correlated with the curvature of the road boundary; and taking the next road point as the initial road point, returning to executing the step of acquiring one boundary point group corresponding to the initial road point in the transverse direction until a distance from last next road point to the current position of the vehicle in the road passing direction is greater than a preset distance threshold, and determining all the currently acquired boundary point groups as the boundary point groups.

The generating the grid obstacle bounding box of the first grid obstacle based on the boundary point comprises:

generating a grid obstacle contour of the first grid obstacle based on the first grid obstacle information; and generating the grid obstacle bounding box based on the grid obstacle contour.

The determining the first grid obstacle located outside the road based on the grid obstacle bounding box and the road bounding box comprises:

for each grid obstacle bounding box, determining a target road bounding box with a smallest Euclidean distance to the grid obstacle bounding box from the road bounding box based on the grid obstacle bounding box and the road bounding box;

performing collision detection on the grid obstacle bounding box and the corresponding target road bounding box; and if the grid obstacle bounding box does not collide with the corresponding target road bounding box, determining that the first grid obstacle corresponding to the grid obstacle bounding box is located outside the road.

The method further comprises:

if the grid obstacle bounding box collides with the corresponding target road bounding box, judging whether the first grid obstacle corresponding to the grid obstacle bounding box is located outside the road.

The judging whether the first grid obstacle corresponding to the grid obstacle bounding box is located outside the road comprises:

performing collision detection based on the boundary point of the target road bounding box and the grid obstacle bounding box through a vector cross product, and judging whether the first grid obstacle corresponding to the grid obstacle bounding box is located outside the road.

The performing the collision detection based on the boundary point of the target road bounding box and the grid obstacle bounding box through the vector cross product, and determining whether the first grid obstacle corresponding to the grid obstacle bounding box is located outside the road, comprise:

determining a boundary point vector;

determining a vertex vector of the grid obstacle bounding box; and when a cross product of the vertex vector of the grid obstacle bounding box and the boundary point vector is greater than 0, determining that the first grid obstacle corresponding to the grid obstacle bounding box is located outside the road.

The method further comprises:

determining a boundary point vector;

determining a vertex vector of the grid obstacle bounding box; and when a cross product of the vertex vector of the grid obstacle bounding box and the boundary point vector is less than or equal than 0, determining that the first grid obstacle corresponding to the grid obstacle bounding box is located in the road.

The aggregating the first grid obstacle located in the road comprises:

generating a first obstacle bounding box of the first grid obstacle based on the first grid obstacle information of the first grid obstacle located in the road;

merging two adjacent first obstacle bounding boxes to generate a second obstacle bounding box when the Euclidean distance between the two adjacent first obstacle bounding boxes is smaller than a width of the vehicle; and taking the second obstacle bounding box as the first obstacle bounding box, and returning to execute the step of merging the two adjacent first obstacle bounding boxes to generate the second obstacle bounding box when the Euclidean distance between the two adjacent first obstacle bounding boxes is smaller than the width of the vehicle until the Euclidean distance between the second obstacle bounding box and the adjacent first obstacle bounding box is greater than or equal to the width of the vehicle or no first obstacle bounding box is adjacent to the second obstacle bounding box.

The making the avoidance decision on the target convex hull obstacle based on the target convex hull obstacle information of the target convex hull obstacle comprises:

marking an avoidance-free label or a lateral avoidance-free label on the target convex hull obstacle meeting a preset filtering condition based on the target convex hull obstacle information; and/or, marking an avoidance label on the target convex hull obstacle based on the target convex hull obstacle information and a guide line of the vehicle, wherein the avoidance label comprises a left passing label, a right passing label or a following label.

The preset filtering condition comprises at least one of the following:

the target convex hull obstacle is located outside the road;

a motion state of the target convex hull obstacle meets a lateral avoidance-free condition; and the target convex hull obstacle is located on the guide line of the vehicle.

The marking the avoidance-free label or the lateral avoidance-free label on the target convex hull obstacle meeting the preset filtering condition based on the target convex hull obstacle information comprises:

when the target convex hull obstacle is located outside the road, marking the avoidance-free label on the target convex hull obstacle; and when the motion state of the target convex hull obstacle meets the lateral avoidance-free condition or the target convex hull obstacle is located on the guide line of the vehicle, marking the lateral avoidance-free label on the target convex hull obstacle.

The lateral avoidance-free condition comprises any one of the following:

the target convex hull obstacle crosses the road;

the target convex hull obstacle changes lane to the lane of the vehicle; and a longitudinal velocity of the target convex hull obstacle is greater than a velocity of the vehicle.

The marking the avoidance label on the target convex hull obstacle based on the target convex hull obstacle information and the guide line of the vehicle comprises:

if the target convex hull obstacle is located on the guide line of the vehicle, marking the following label on the target convex hull obstacle; and if the target convex hull obstacle is not located on the guide line of the vehicle, when a center of mass of the target convex hull obstacle is located at a left side of the guide line of the vehicle, marking the right passing label on the target convex hull obstacle, and when the center of mass of the target convex hull obstacle is located on a right side of the guide line of the vehicle, marking the left passing label on the target convex hull obstacle.

The method further comprises:

if it is determined that there is no obstacle in front of the vehicle or a longitudinal velocity of the first obstacle in front of the vehicle is greater than or equal to a longitudinal velocity of the vehicle based on the environmental perception information, a preset time period is determined as the passing time cost.

The method further comprises:

determining an ST diagram curve of the vehicle and an ST diagram curve of obstacles based on the environmental perception information;

determining a danger area of the vehicle based on the ST diagram curve of the vehicle;

judging whether the ST diagram curve of obstacles overlaps with the danger area of the vehicle within the preset time; and if the ST diagram curve of obstacles overlaps with the danger area of the vehicle within the preset time, determining that the obstacle enters the danger area of the vehicle within the preset time; otherwise, determining that the obstacle does not enter the danger area of the vehicle within the preset time.

The lane decision semantic information further comprises a passing width cost, and the determining the lane decision semantic information of each lane based on the environmental perception information comprises:

determining a minimum passing width of the lane based on the lane information and the static obstacle information; and determining he minimum passing width as the passing width cost.

The determining the minimum passing width of the lane based on the lane information and the static obstacle information comprises:

determining a maximum passing width of each static obstacle on the lane based on the lane information and the static obstacle information; and determining a minimum value of the maximum passing width of each static obstacle as the minimum passing width of the lane.

The lane decision semantic information further comprises a stability cost, and the determining the lane decision semantic information of each lane based on the environmental perception information comprises:

determining a lane of the vehicle and other lanes based on the lane information and the vehicle information;

for the lane of the vehicle, determining a first preset stability cost as the stability cost; and for other lanes, determining a second preset stability cost as the stability cost, wherein the second preset stability cost is different from the first preset stability cost.

The generating the drivable area based on the lane decision semantic information comprises:

weighting and summing various costs in the lane decision semantic information; and generating the drivable area based on a weighting and summing result.

After generating the drivable area based on the lane decision semantic information, the method further comprises:

discretizing a boundary of the drivable area.

After generating the drivable area based on the lane decision semantic information, the method further comprises at least one of the following:

updating the drivable area based on a preset traffic rule;

updating the drivable area based on kinematic and dynamic constraints of the vehicle;

updating the drivable area based on the obstacle semantic information and the preset safe area, wherein the preset safe area is connected with the drivable area; and updating the drivable area based on the static obstacle information, the obstacle decision-making semantic information and a light tracing algorithm, wherein the obstacle decision-making semantic information comprises passing from a left side of the obstacle or passing from a right side of the obstacle.

The updating the drivable area based on the obstacle semantic information and the preset safe area comprises:

determining an obstacle needing to be avoided laterally based on the obstacle semantic information; and when a moving trajectory of the obstacle needing to be avoided laterally occupies a preset safety area, trimming a part of the drivable area occupying a corresponding position of the preset safety area.

The updating the drivable area based on the static obstacle information, the obstacle decision-making semantic information and the light tracing algorithm comprises:

determining a collision point between the light and the obstacle based on the static obstacle information, the obstacle decision-making semantic information and the light tracing algorithm, wherein the collision point is located in the drivable area; and updating the drivable area based on the collision point.

The updating the collision point between the light and the obstacle based on the static obstacle information, the obstacle decision-making semantic information and the light tracing algorithm comprises:

determining a light source point and a light projection direction based on the obstacle decision-making semantic information;

determining a light projection scope based on the static obstacle information;

scanning the obstacle with light based on the light source point, the light projection direction and the light projection scope; and determining the collision point between the light and the obstacle.

A decision-making method for avoiding obstacle comprises:

acquiring road information, first grid obstacle information of a first grid obstacle, and first convex hull obstacle information of a first convex hull obstacle;

obtaining a second grid obstacle by preprocessing the first grid obstacle based on the road information and the first grid obstacle information;

converting the second grid obstacle into a second convex hull obstacle; and making an avoidance decision for avoiding a target convex hull obstacle based on target convex hull obstacle information of the target convex hull obstacle, wherein the target convex hull obstacle comprises the first convex hull obstacle and/or the second convex hull obstacle.

A method for generating a drivable area of a vehicle comprises:

acquiring environmental perception information, wherein the environmental perception information comprises at least two of lane information, obstacle information and vehicle information, and the obstacle information comprises static obstacle information and/or dynamic obstacle information;

determining lane decision semantic information of each lane based on the environmental perception information, wherein the lane decision semantic information comprises a passing time cost and a safety cost; and generating the drivable area based on the lane decision semantic information.

The above are only specific embodiments of the present disclosure, so that those skilled in the art can understand or realize the present disclosure. Various modifications to these embodiments will be apparent to those skilled in the art, and the generic principles defined herein may be embodied in other embodiments without departing from the spirit or scope of the present disclosure. Therefore, the present disclosure will not to be limited to these embodiments shown herein, but is to be in conformity with the widest scope consistent with the principles and novel features disclosed herein.

According to the present disclosure, the obstacle with the grid types are converted into the obstacle with the convex types, so that unified decision-making of the grid type and convex hull type obstacles are implemented, thus simplifying the obstacle decision-making process of the mixed type obstacles, accelerating the obstacle decision-making process, and enabling the decision-making planning module to perform the obstacle decision-making conveniently and quickly. Therefore, the present disclosure has very strong industrial applicability.

What is claimed is:

1. A decision-making method for avoiding an obstacle, comprising:

acquiring road information, first grid obstacle information of a first grid obstacle, and first convex hull obstacle information of a first convex hull obstacle;

obtaining a second grid obstacle by preprocessing the first grid obstacle based on the road information and the first grid obstacle information;

converting the second grid obstacle into a second convex hull obstacle;

making an avoidance decision for avoiding a target convex hull obstacle based on target convex hull obstacle information of the target convex hull obstacle, wherein the target convex hull obstacle comprises the first convex hull obstacle and/or the second convex hull obstacle; and based on the avoidance decision by an automatic driving system, causing a vehicle to pass on a left side or right side of an obstacle of the vehicle to ensure that the vehicle does not collide with the obstacle of the vehicle.

2. The method according to claim 1, wherein the obtaining of the second grid obstacle by preprocessing the first grid obstacle based on the road information and the first grid obstacle information further comprises:

filtering out the first grid obstacle outside a road based on the road information and the first grid obstacle information; and taking a remaining part of the first grid obstacle as the second grid obstacle; and/or, determining the first grid obstacle located in the road based on the road information and the first grid obstacle information; aggregating the first grid obstacle located in the road; and taking the aggregated first grid obstacle as the second grid obstacle.

3. The method according to claim 2, wherein the filtering out of the first grid obstacle outside a road based on the road information and the first grid obstacle information further comprises:

generating a road bounding box along a road passing direction based on the road information;

generating a grid obstacle bounding box of the first grid obstacle based on the first grid obstacle information;

determining the first grid obstacle located outside the road based on the grid obstacle bounding box and the road bounding box; and filtering out the first grid obstacle located outside the road.

4. The method according to claim 3, wherein the generating of the road bounding box along the road passing direction based on the road information further comprises:

discretizing a road boundary into boundary points based on the road information; and generating the road bounding box based on the boundary points.

5. The method according to claim 4, wherein the discretizing of the road boundary into boundary points based on the road information further comprises:

determining the road boundary and a curvature of the road boundary based on the road information; and discretizing the road boundary based on the curvature of the road boundary to obtain boundary point groups arranged at intervals along a road passing direction, wherein each boundary point group comprises left boundary points and right boundary points corresponding in a transverse direction, and the transverse direction is perpendicular to the road passing direction.

6. The method according to claim 5, wherein the discretizing of the road boundary based on the curvature of the road boundary to obtain boundary point groups arranged at intervals along a road passing direction further comprises:

taking a current position of the vehicle as an initial road point;

acquiring one boundary point group corresponding to the initial road point in the transverse direction;

selecting next road point along the road passing direction based on the curvature of the road boundary, wherein a distance between two adjacent road points is negatively correlated with the curvature of the road boundary; and taking the next road point as the initial road point, returning to executing the step of acquiring one boundary point group corresponding to the initial road point in the transverse direction until a distance from last next road point to the current position of the vehicle in the road passing direction is greater than a preset distance threshold, and determining all the currently acquired boundary point groups as the boundary point groups.

7. The method according to claim 4, wherein the generating of the road bounding box based on the boundary points further comprises:

generating a rectangular frame passing through each boundary point in any two adjacent boundary point groups based on any two adjacent boundary point groups, and taking the rectangular frame as the road bounding box.

8. The method according to claim 3, wherein generating the grid obstacle bounding box of the first grid obstacle based on the first grid obstacle information further comprises:

generating a grid obstacle contour of the first grid obstacle based on the first grid obstacle information; and generating the grid obstacle bounding box based on the grid obstacle contour.

9. The method according to claim 3, wherein the determining of the first grid obstacle located outside the road based on the grid obstacle bounding box and the road bounding box further comprises:

for each grid obstacle bounding box, determining a target road bounding box with a smallest Euclidean distance to the grid obstacle bounding box from the road bounding box based on the grid obstacle bounding box and the road bounding box;

performing collision detection on the grid obstacle bounding box and the corresponding target road bounding box; and based on that the grid obstacle bounding box does not collide with the corresponding target road bounding box, determining that the first grid obstacle corresponding to the grid obstacle bounding box is located outside the road.

10. The method according to claim 9, further comprising:

based on that the grid obstacle bounding box collides with the corresponding target road bounding box, judging whether the first grid obstacle corresponding to the grid obstacle bounding box is located outside the road.

11. The method according to claim 10, wherein the judging of whether the first grid obstacle corresponding to the grid obstacle bounding box is located outside the road further comprises:

performing collision detection based on the boundary point of the target road bounding box and the grid obstacle bounding box through a vector cross product, and judging whether the first grid obstacle corresponding to the grid obstacle bounding box is located outside the road.

12. The method according to claim 11, wherein the performing of the collision detection based on the boundary point of the target road bounding box and the grid obstacle bounding box through the vector cross product, and determining whether the first grid obstacle corresponding to the grid obstacle bounding box is located outside the road further comprises:

determining a boundary point vector;

determining a vertex vector of the grid obstacle bounding box; and when a cross product of the vertex vector of the grid obstacle bounding box and the boundary point vector is greater than 0, determining that the first grid obstacle corresponding to the grid obstacle bounding box is located outside the road.

13. The method according to claim 2, wherein the aggregating of the first grid obstacle located in the road further comprises:

generating a first obstacle bounding box of the first grid obstacle based on the first grid obstacle information of the first grid obstacle located in the road;

merging two adjacent first obstacle bounding boxes to generate a second obstacle bounding box when the Euclidean distance between the two adjacent first obstacle bounding boxes is smaller than a width of the vehicle; and taking the second obstacle bounding box as the first obstacle bounding box, and returning to execute the step of merging the two adjacent first obstacle bounding boxes to generate the second obstacle bounding box when the Euclidean distance between the two adjacent first obstacle bounding boxes is smaller than the width of the vehicle until the Euclidean distance between the second obstacle bounding box and the adjacent first obstacle bounding box is greater than or equal to the width of the vehicle or no first obstacle bounding box is adjacent to the second obstacle bounding box.

14. The method according to claim 1, wherein the making of the avoidance decision on the target convex hull obstacle based on the target convex hull obstacle information of the target convex hull obstacle further comprises:

marking an avoidance-free label or a lateral avoidance-free label on the target convex hull obstacle meeting a preset filtering condition based on the target convex hull obstacle information; and/or, marking an avoidance label on the target convex hull obstacle based on the target convex hull obstacle information and a guide line of the vehicle, wherein the avoidance label comprises a left passing label, a right passing label or a following label.

15. The method according to claim 14, wherein the preset filtering condition comprises at least one of the following:

the target convex hull obstacle is located outside the road;

a motion state of the target convex hull obstacle meets a lateral avoidance-free condition; and the target convex hull obstacle is located on the guide line of the vehicle.

16. The method according to claim 15, wherein the marking of the avoidance-free label or the lateral avoidance-free label on the target convex hull obstacle meeting the preset filtering condition based on the target convex hull obstacle information further comprises:

when the target convex hull obstacle is located outside the road, marking the avoidance-free label on the target convex hull obstacle; and when the motion state of the target convex hull obstacle meets the lateral avoidance-free condition or the target convex hull obstacle is located on the guide line of the vehicle, marking the lateral avoidance-free label on the target convex hull obstacle.

17. The method according to claim 15, wherein the lateral avoidance-free condition comprises any one of the following:

the target convex hull obstacle crosses the road;

the target convex hull obstacle changes lane to the lane of the vehicle; and a longitudinal velocity of the target convex hull obstacle is greater than a velocity of the vehicle.

18. The method according to claim 14, wherein the marking of the avoidance label on the target convex hull obstacle based on the target convex hull obstacle information and the guide line of the vehicle further comprises:

based on that the target convex hull obstacle is located on the guide line of the vehicle, marking the following label on the target convex hull obstacle; and based on that the target convex hull obstacle is not located on the guide line of the vehicle, when a center of mass of the target convex hull obstacle is located at a left side of the guide line of the vehicle, marking the right passing label on the target convex hull obstacle, and when the center of mass of the target convex hull obstacle is located on a right side of the guide line of the vehicle, marking the left passing label on the target convex hull obstacle.

19. An electronic device, comprising:

a memory and one or more processors;

wherein the memory is in communication connection with the one or more processors, the memory stores instructions executable by the one or more processors, and when the instructions are executed by the one or more processors, the electronic device is configured for implementing:

acquiring road information, first grid obstacle information of a first grid obstacle, and first convex hull obstacle information of a first convex hull obstacle;

obtaining a second grid obstacle by preprocessing the first grid obstacle based on the road information and the first grid obstacle information;

converting the second grid obstacle into a second convex hull obstacle;

making an avoidance decision for avoiding a target convex hull obstacle based on target convex hull obstacle information of the target convex hull obstacle, wherein the target convex hull obstacle comprises the first convex hull obstacle and/or the second convex hull obstacle; and based on the avoidance decision, causing a vehicle to pass on a left side or right side of an obstacle of the vehicle to ensure that the vehicle does not collide with the obstacle of the vehicle.

20. A non-transitory computer readable storage medium storing a computer-executable instruction thereon, wherein the computer-executable instruction, when executed by a computing device, is configured for implementing:

acquiring road information, first grid obstacle information of a first grid obstacle, and first convex hull obstacle information of a first convex hull obstacle;

obtaining a second grid obstacle by preprocessing the first grid obstacle based on the road information and the first grid obstacle information;

converting the second grid obstacle into a second convex hull obstacle;

making an avoidance decision for avoiding a target convex hull obstacle based on target convex hull obstacle information of the target convex hull obstacle, wherein the target convex hull obstacle comprises the first convex hull obstacle and/or the second convex hull obstacle; and based on the avoidance decision, causing a vehicle to pass on a left side or right side of an obstacle of the vehicle to ensure that the vehicle does not collide with the obstacle of the vehicle.

* * * * *